(12) United States Patent
Gustavsson et al.

(10) Patent No.: US 8,018,644 B2
(45) Date of Patent: Sep. 13, 2011

(54) CONTROL OF ELECTROCHROMIC DEVICE

(75) Inventors: Greger Gustavsson, Uppsala (SE);
Peter Georen, Solna (SE)

(73) Assignee: ChromoGenics AB, Uppsala (SE)

( * ) Notice: Subject to any disclaimer, the term of this patent is extended or adjusted under 35 U.S.C. 154(b) by 0 days.

(21) Appl. No.: 12/602,534

(22) PCT Filed: May 28, 2008

(86) PCT No.: PCT/SE2008/050625
§ 371 (c)(1),
(2), (4) Date: Dec. 1, 2009

(87) PCT Pub. No.: WO2008/147322
PCT Pub. Date: Dec. 4, 2008

(65) Prior Publication Data
US 2010/0172010 A1    Jul. 8, 2010

(30) Foreign Application Priority Data
Jun. 1, 2007  (SE) ...................... 0701367

(51) Int. Cl.
*G02F 1/163* (2006.01)
(52) U.S. Cl. ...................................... 359/296
(58) Field of Classification Search .......... 359/265–275, 359/601, 602, 603, 604, 838
See application file for complete search history.

(56) References Cited

U.S. PATENT DOCUMENTS

| | | | |
|---|---|---|---|
| 4,412,215 A | 10/1983 | Portmann | |
| 5,822,107 A | 10/1998 | Lefrou et al. | |
| 5,973,819 A | 10/1999 | Pletcher et al. | |
| 6,084,700 A | 7/2000 | Knapp et al. | |
| 6,362,806 B1 | 3/2002 | Reichmann et al. | |
| 6,404,532 B1 | 6/2002 | Berneth et al. | |
| 7,133,181 B2 | 11/2006 | Greer | |
| 7,372,610 B2 * | 5/2008 | Burdis et al. | 359/265 |
| 2003/0202249 A1 * | 10/2003 | Schierbeek | 359/603 |

FOREIGN PATENT DOCUMENTS

| | | |
|---|---|---|
| EP | 0 677 427 A2 | 10/1995 |
| EP | 0 869 032 A2 | 10/1998 |
| EP | 1 619 546 A2 | 1/2006 |
| WO | WO 97/28484 A1 | 8/1997 |

OTHER PUBLICATIONS

International Search Report, dated Oct. 1, 2008, from corresponding PCT application.
Supplementary European Search Report, dated Feb. 22, 2011, for corresponding PCT application.

* cited by examiner

*Primary Examiner* — Ricky Mack
*Assistant Examiner* — Tuyen Tra
(74) *Attorney, Agent, or Firm* — Young & Thompson

(57) ABSTRACT

A method of controlling transmittance of an electrochromic device is presented. The electrochromic device to be controlled has a first and a second electron conducting layer, a first electrochromic layer covering the first electron conducting layer, a counter electrode layer covering the second electron conducting layer and an electrolyte layer laminated between the first electrochromic layer and the counter electrode layer. The method comprises applying (212) of a sequence of voltage pulses between the first and second electron conducting layers and providing of an open circuit between the first and second electron conducting layers between the applied voltage pulses. The method is characterized by measuring (214) a voltage between the first and second electron conducting layers during a period of the open circuit and controlling (220) a pulse parameter of the voltage pulses dependent on the measured voltage, where the pulse parameter is one of pulse duration and pulse voltage.

14 Claims, 12 Drawing Sheets

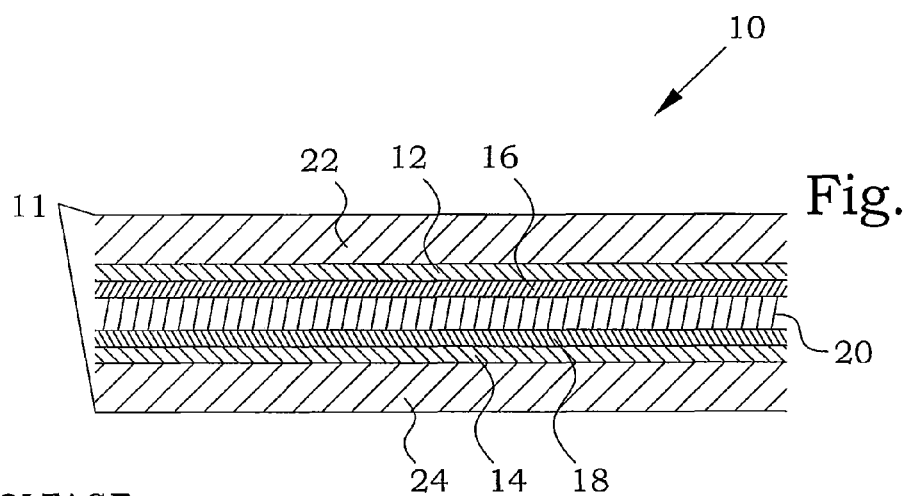
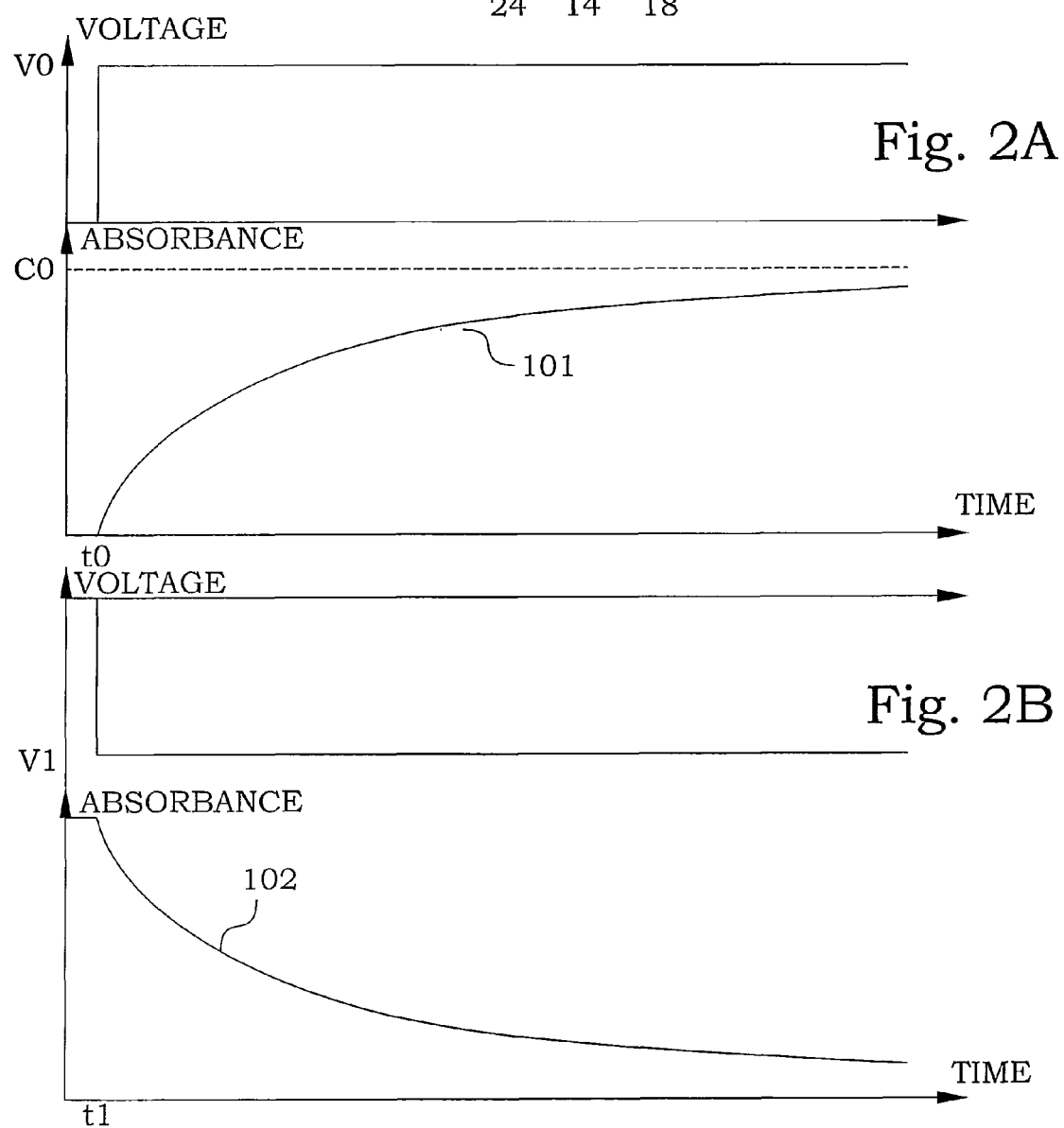

CONTROL OF ELECTROCHROMIC DEVICE

TECHNICAL FIELD

The present invention relates in general to electrochromic devices and methods for operating such devices, and in particular to methods and devices for controlling transmittance of an electrochromic device.

BACKGROUND

Electrochromic devices are devices capable of changing its transmittance of light in dependence of an applied electric signal. Applications of electrochromic devices include among other things architectural windows, information displays, light filters and modulators, rear-view mirrors, sun-roofs and windows in vehicles, eyewear, helmet visors, ski goggles, surfaces with variable thermal emissivity or camouflage.

Different types of electrochromic devices are available. Some devices require a continuous supply of electrical voltage or energy to maintain a certain transmittance level, and are typically referred to as self-erasing devices. Other devices are changed from one transmittance state to another by means of electrical signals but maintain essentially the transmittance if disconnected.

A typical electrochromic device of the latter type comprises five superimposed layers deposited on one substrate or positioned between two substrates in a joined together configuration. The central part of the five-layer electrochromic stack is an ion conductor, also referred to as an electrolyte. The ion conductor is in contact with an electrochromic film, capable of conducting ions. On the other side of the ion conductor is an electron and ion conducting counter electrode film serving as an ion storage layer. The central three-layer structure is positioned between electron conducting layers. Such a device is colored and bleached, respectively, by applying an external voltage pulse between the electron conducting layers on the two sides of the stack, causing the electrons and ions to move between the electrochromic layer and the counter electrode layer. The way this voltage pulse is applied to the electrochromic device is crucial to its performance.

In principle, the simplest way of driving an electrochromic device (ECD) is to apply a coloration or bleaching pulse over a certain, specified, interval of time. A typical pulse used is a rectangular pulse, specified by parameters, such as potential and time. In case of coloration, a coloration potential and a coloration time are defined. The changes in transmittance of the ECD are related to the amount of charge supplied to or extracted from the ECD. The duration of the pulses are therefore of importance. Such an approach is presented in the U.S. Pat. No. 4,412,215, where a control method using fixed times for the coloration of electrochromic devices is disclosed. In order to bleach the electrochromic device, a voltage pulse with opposite polarity is applied and a bleaching potential and a bleaching time are defined. The applied voltage has to be adapted to the used ECD. A too large voltage will destroy the ECD, at least when being applied during a longer time.

In practice, a method of switching based on pre-determined time intervals is not useful in all applications for two main reasons. First, the switching speed of an electrochromic device is strongly dependent on the temperature at which the device is operated. Secondly, the switching speed of an electrochromic device may also change upon its lifetime. An old device may therefore have a different switching speed than a new one. The implications of these aspects are that to achieve the same optical transmittance in the colored and bleached states, the coloration and bleaching pulse, respectively, must be of different duration depending on operation conditions and/or device history. In other words, a voltage pulse of the same duration leads to different degree of coloration or bleaching under different conditions.

A specific example of devices exposed for large varying conditions may be a motorcycle helmet visor used in a cold environment compared to one used on a hot summer day. Another example is an electrochromic facade window exposed to temperature changes throughout the day, season or year. Yet another example is a rear-view mirror or a sun-roof in a car.

Most prior art controlling methods for electrochromic devices do not take the aging of the device into account. A new and fresh ECD has other properties than an ECD that has endured several thousands of cycles. Thus, they cannot be controlled with the same set of parameters for an optimal performance.

There have been earlier attempts to solve these problems. A safe way of achieving the correct coloration and bleaching times is to actually measure the transmittance and interrupt the coloration or bleaching when the required transmittance level is achieved. This is e.g. disclosed in the U.S. Pat. No. 5,822,107, where a method combines time control with measurements of physical characteristics such as voltage, current or light transmittance of the glazing. This, however, requires additional means for optical measurements, which makes the system more complex. There may be cases where the transmittance measurement is not possible, such as non-transparent displays. There may also be cases where an optical sensor would be in the line of sight, disturbing the view in a consumer product or the light beam in an instrument.

There are many prior art disclosures presenting different types of control methods. The U.S. Pat. No. 6,404,532 discloses a system and method for controlling an electrochromic device. The system comprises a light source and an optical detector arranged at opposite sides of an electrochromic window for measuring an attenuation of the light. A pulse-width modulated power signal is used as an input to the electrochromic window.

The U.S. Pat. No. 7,133,181 discloses a control system for an ECD capable of estimating the temperature of the ECD without requiring an external temperature monitoring element and then controlling the ECD based, in part, upon the temperature readings. The controller also provides for methods of determining a bleaching and coloration history of the ECD, determining the transmission state of the ECD and applying a holding voltage to maintain the transmission state of the ECD. Control of ECD coloration and bleaching is performed by using pulsed voltage signals.

A further problem with prior art ECD controlling is the risk of damaging the ECD by high voltages. High voltages have in general negative effects on the lifetime, except for short pulses. This is particularly true for applications where large temperature or ageing differences may be present. The published international patent application WO97/28484 describes a safe driving method, based on applying a pre-set constant current, and specifying the voltage limits that may not be exceeded. If a low current value is specified, the method provides a safe operation mode, however, at expense of slow switching speed.

RELATED ART

The U.S. Pat. No. 6,084,700 discloses an electronic circuit for a self-erasing electrochromic element, where a pulse width modulated signal is coupled to the electrochromic element without signal averaging in order to maintain a certain level of transmittance. In order to compensate for the compressed operating range of the reflectance characteristic under such conditions, the electronic circuit utilizes active loading or alternatively voltage feedback of the electrochromic element to provide a reflectance response characteristic with an uncompressed linear operating range similar to a reflectance characteristic for an electrochromic element with a DC drive circuit.

The published European patent application EP0869032 discloses a rearview mirror system having a self-erasing electrochromic element. A drive circuit controls the partial reflectance level as a function of the duty cycle of the pulsed drive signal. The drive circuit additionally adjusts the amplitude of the pulses as a function of the voltage that is developed across the electrochromic cell during the pulse.

SUMMARY

A general object of the present invention is therefore to provide improved methods and devices for controlling non-self-erasing electrochromic devices. Another general object of the present invention is to provide faster switching between colored and bleached states and vice versa. A further object of the present invention is to provide a faster switching in an initial coloration or bleaching process with preserved lifetime of the electrochromic device. A further object of the present invention is to provide means and methods for detecting a status of an electrochromic device and adopting a coloration or bleaching process accordingly. Yet a further object of the present invention is to simplify the control circuitry. Yet a further object of the present invention is to provide a control method capable of stopping the coloration process at arbitrary transmittance levels. Yet a further object of the present invention is to provide a control method that is independent of the size and shape of the electrochromic device.

The above objects are achieved by methods and devices according to the enclosed patent claims. According to the present invention, in a first aspect, a method of controlling transmittance of an electrochromic device is presented. The electrochromic device to be controlled has a first electron conducting layer and a second electron conducting layer, a first electrochromic layer at least partially covering the first electron conducting layer, a counter electrode layer at least partially covering the second electron conducting layer and an electrolyte layer laminated between and at least partially covering the first electrochromic layer and the counter electrode layer. The method comprises applying of a sequence of voltage pulses between the first and second electron conducting layers and providing of an open circuit between the first and second electron conducting layers between the applied voltage pulses. The method is characterised by measuring at least one value of a voltage between the first and second electron conducting layers during a period of the open circuit and controlling a pulse parameter of the voltage pulses dependent on the measured voltage value, where the pulse parameter is at least one of pulse duration and pulse voltage or quantities directly derivable therefrom.

In a second aspect, an electrochromic device comprises a first electron conducting layer, a second electron conducting layer, a first electrochromic layer at least partially covering the first electron conducting layer, a counter electrode layer at least partially covering the second electron conducting layer, an electrolyte layer laminated between and at least partially covering the first electrochromic layer and the counter electrode layer, and a transmittance controlling electronic device.

The transmittance controlling electronic device comprises a voltage source connected between the first and second electron conducting layers and arranged for applying a sequence of voltage pulses, and means for providing an open circuit between the first and second electron conducting layers between the applied voltage pulses. The electrochromic device is characterised in that the transmittance controlling electronic device further comprises a voltage sensor connected between the first and second electron conducting layers and arranged for measuring at least one value of a voltage during a period of the open circuit, and a controller connected to the voltage sensor and the voltage source. The controller is arranged for controlling a pulse parameter of the voltage pulses dependent on an output from the voltage sensor, where the pulse parameter is at least one of pulse duration or pulse voltage or quantities directly derivable therefrom.

One advantage with the present invention is that rapid optical modulation of electrochromic devices is enabled, automatically compensating for certain ageing and environmental parameters. A number of other advantages are provided by preferred embodiment.

BRIEF DESCRIPTION OF THE DRAWINGS

The invention, together with further objects and advantages thereof, may best be understood by making reference to the following description taken together with the accompanying drawings, in which:

FIG. 1 is a schematic view of an embodiment of a layer stack of an electrochromic device;

FIGS. 2A-B are diagrams illustrating charging and discharging, respectively, of electrochromic devices by use of constant applied voltage;

DETAILED DESCRIPTION

Figure 3:
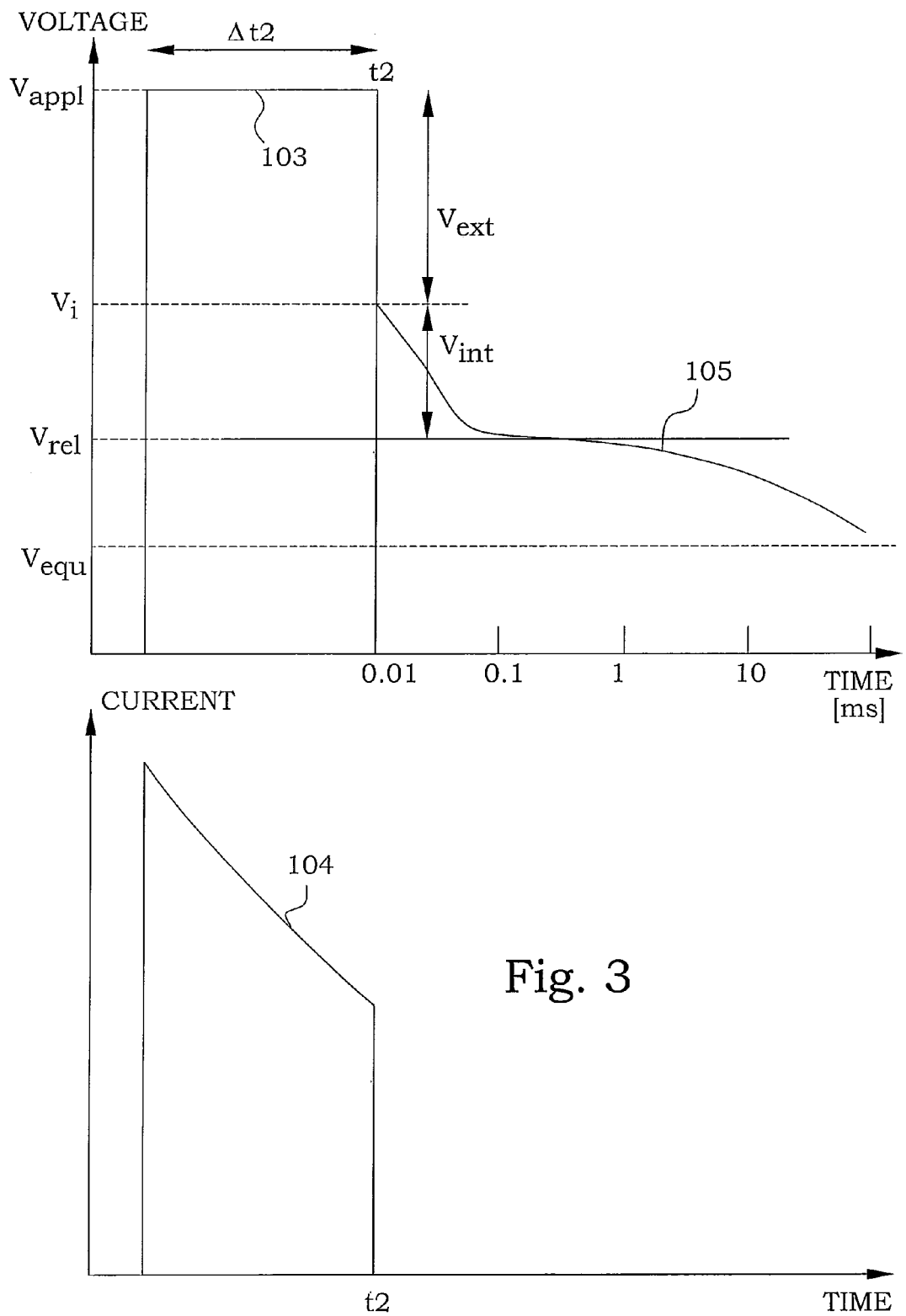
FIG. 3 illustrates diagrams characterizing an embodiment of charging of electrochromic devices by use of a voltage pulse.

Throughout the present disclosures, equal or directly corresponding features in different figures and embodiments will be denoted by the same reference numbers.

Electrochromic materials are in the present disclosure defined as materials that are able to change their optical properties, persistently and reversibly, under insertion/extraction of ions and electrons. An electrochromic layer is subsequently a layer comprising an electrochromic material.

FIG. 1 illustrates a typical configuration of an electrochromic layer stack 11 of an electrochromic device 10 of a non-self-erasing type. In the centre part, an ion conductor, i.e. an electrolyte layer 20 is provided. The electrolyte layer 20 is on one side in contact with an electrochromic layer 16, capable of conducting electrons as well as ions. On the other side of the ion conductor 20 is an electron and ion conducting counter electrode layer 18, serving as an ion storage layer. This counter electrode film 18 may entirely or partly be constituted by a second electrochromic film. The central three-layer structure 16, 18, 20 is positioned between electron conducting layers 12, 14. The electron conducting layers 12, 14 are arranged against a first 22 and a second 24 substrate, respectively.

Note that the relative thicknesses of the layers in the different figures in the present disclosure do not represent the true relationship in dimensions. Typically, the substrates are much thicker than the other layers. The figures are drawn only for the purpose to illustrate connection principles, not to give any dimensional information.

Such an electrochromic device 10 is colored/bleached by applying an external voltage pulse between the electron conducting layers 12, 14 on the two sides of the stack 11, causing the electrons and ions to move between the electrochromic layer 16 and the counter electrode layer 18. The electrochromic layer 16 will thereby change its color. Non-exclusive examples of electrochromic layers 16 are cathodically coloring thin films of oxides based on tungsten, molybdenum, niobium, titanium, lead and/or bismuth, or anodically coloring thin films of oxides, hydroxides and/or oxy-hydrides based on nickel, iridium, iron, chromium, cobalt and/or rhodium.

At least one of the substrates 22, 24 has to be transparent, in order to reveal the electrochromic properties of the electrochromic layer 16 to the surroundings. In a typical case today, plastic substrates are used. In the most general sense, a plastic substrate 22, 24 is a synthetic or semisynthetic polymerization product. The plastic substrate is commonly classified by its polymer backbone. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers Also at least one of the two electron conducting layers 12, 14 must be transparent. Non-exclusive examples of electron conductors 12, 14 transparent to visible light are thin films of Indium Tin oxide (ITO), Tin oxide, Zinc oxide, n- or p-doped Zinc oxide and Zinc oxyfluoride. Metal-based layers, such as ZnS/Ag/ZnS and carbon nanotube layers have been recently explored as well. Depending on the particular application, one or both electron conductor layers 12, 14 may be made of a metal grid.

As mentioned above, a counter electrode layer 18 may comprise electrochromic materials as well as non-electrochromic materials. Non-exclusive examples of counter electrode layers 18 are cathodically coloring electrochromic thin films of oxides based on tungsten, molybdenum, niobium, titanium, lead and/or bismuth, anodically coloring electrochromic thin films of oxides, hydroxides and/or oxy-hydrides based on nickel, iridium, iron, chromium, cobalt and/or rhodium, or non-electrochromic thin films e.g. of oxides based on vanadium and/or cerium as well as activated carbon. Also combinations of such materials can be used as a counter electrode layer 18.

The electrolyte layer 20 comprises an ion conductor material. The electrolyte layer 20 may be transparent or non-transparent, colored or non-colored, depending on the application. Some non-exclusive examples of electrolyte types are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of TiO2, silica or other oxides. Some non-exclusive examples of lithium salts used are LiTFSI [lithium bis(trifluoromethane)sulfonimide], LiBF4 [lithium tetrafluoroborate], LiAsF6 [lithium hexafluoro arsenate], LiCF3SO3 [lithium trifluoromethane sulfonate], and LiClO4 [lithium perchlorate].

FIG. 2A illustrates a coloration process of an ECD using a constant voltage input. At time t0, a constant voltage V0 is applied over an ECD. In the present disclosure, a positive voltage is defined as giving the counter electrode a higher potential than the electrochromic film. This means that coloration is achieved by applying a higher voltage and bleaching is achieved by applying a lower voltage. The voltages that are needed depend on the choice of materials. A typical voltage used for coloration of an ECD based on a tungsten oxide electrochromic layer and a nickel oxide counter electrode layer, according to the embodiment illustrated in FIG. 1, is in the range of 0.6 to 2V and more typically around 1.6 V. A coloration, i.e. an absorbance of the ECD, as represented by a curve 101 increases with time and reaches eventually a steady color level C0. In other words, the transmittance of the ECD decreases gradually. This steady absorbance level of a disconnected ECD corresponds to a voltage over the ECD of V0. A serious problem is that the color increase is generally slow. In particular in an initial phase of the coloration, a user is often interested in having a quick switching into at least a partially colored state. The last few percent of the coloration is usually not as critical for a user.

FIG. 2B illustrates similarly a bleaching process of a typical ECD using a constant voltage input. At time t1, a constant voltage V1 is applied over an ECD, in this embodiment with an opposite polarity compared to the previous case. A typical voltage used for bleaching the tungsten/nickel based ECD according to the embodiment illustrated in FIG. 1 is in the range of 0 to −2V and more typically around −1.4 V. In this embodiment, the polarity is thus opposite compared to the coloration voltage. However, in other choices of materials for electrochromic films and counter electrodes, the voltage levels may be different and bleaching may even in some cases be obtained also by positive voltages. A bleaching of the ECD, i.e. a reduction of absorbance, as represented by a curve 102 takes place and the absorbance reaches eventually a level close to a state corresponding to a maximum transmittance. This absorbance level of a disconnected ECD corresponds to a voltage over the ECD of V1. Also the initial part of a bleaching process is experienced as rather slow.

The ECD is in general relatively sensitive to longer periods of a voltage outside the intended operation range. A steady voltage somewhat higher than the optimum voltage for maximum coloration or maximum bleaching will decrease the lifetime of an ECD. However, it is found that shorter periods, typically less than a second, of applied voltages above the maximum operation voltage do not significantly harm the ECD.

The charging process of an ECD is a complex process, where different kinetically dependent factors are involved. The charging does not correspond to conventional capacitor charging. A diagram in FIG. 3 illustrates a typical effect of a voltage signal applied over an ECD. In the upper part of the diagram, an applied voltage signal 103 with finite duration, $\Delta t2$, and amplitude of $V_{appl}$ is illustrated. After the voltage signal is ended, at time t2, the ECD is disconnected from any external voltage, e.g. an open circuit between the opposite sides of the ECD is provided. In the lower part, a corresponding charging current 104 is illustrated. It can be noted that the current 104 successively is reduced.

FIG. 3 depicts a voltage of an ECD during relaxation as measured with a transient recorder with high sampling rate (100 kHz). An immediate drop from the applied voltage level $V_{appl}$ to an initial voltage $V_i$ occurs essentially instantly. This instant drop $V_{ext}$ corresponds to ohmic losses in e.g. conductors and connections to the ECD, i.e. in external components connected to the ECD. Note that the time scale after the time t2 is given in a logarithmic scale. From this initial voltage $V_i$, a relaxation takes place. As can be seen there is an initial voltage drop, $V_{int}$, during the first 60 μs.

During this period the ohmic losses are relaxed over the double layer of the electrode/electrolyte interfaces of the ECD, i.e. internal ohmic losses. After this relaxation, the cell voltage remains rather constant for a few milliseconds at a level of approximately $V_{rel}$, after which it continues to relax faster (in the logarithmic time scale) again. This plateau at $V_{rel}$ represents the electrochemical voltage of the cell, comprising both the equilibrium voltage and the overvoltages of each electrode of the ECD. After the final relaxation the cell would reach the equilibrium voltage $V_{equ}$, however this final relaxation is very slow and would typically take several hours to complete.

The disclosed method measures a value of the cell voltage when the device has relaxed to this plateau or ohmically relaxed state. This plateau cell voltage is what the algorithm employs as feedback voltage. By using this as the control-parameter the method operates in a way so that the driver compensates for the resistive losses by applying a higher effective voltage, and aims at never having the plateau voltage exceed the threshold voltage. As the plateau voltage reaches the threshold voltage the duty cycle or applied voltage is reduced, thus reducing the time-averaged applied voltage. If the plateau-voltage exceeds the threshold voltage, there is significant risk for degradation of the materials because of various electrochemical and chemical side reactions that would make the device fail. At the end of the charge or discharge sequence the duty cycle value or applied voltage is small, meaning that a very low current is running. This means that the measured plateau-voltage in fact approaches the fully relaxed equilibrium voltage of the cell.

An embodiment of the presently disclosed method samples the voltage at the end of the open circuit period of each applied voltage pulse. As an example, using a pulse frequency of 200 Hz, and a duty cycle (DC) of 50%, this means that the feedback voltage is sampled after approximately 2.5 ms of relaxation at open circuit. At the same frequency, but with a DC of only 5%, the relaxation time before sampling feedback voltage is 4.75 ms.

This behavior is specific for non-self-erasing ECD's.

It is realized by anyone skilled in the art that it is difficult if not even impossible to foresee all parameters and provide predetermined control parameters in all situations. However, it is also realized by anyone skilled in the art that the relaxation behavior comprises information related e.g. to temperature or ageing. This can indeed be utilized in controlling the ECD.

Figure 4:
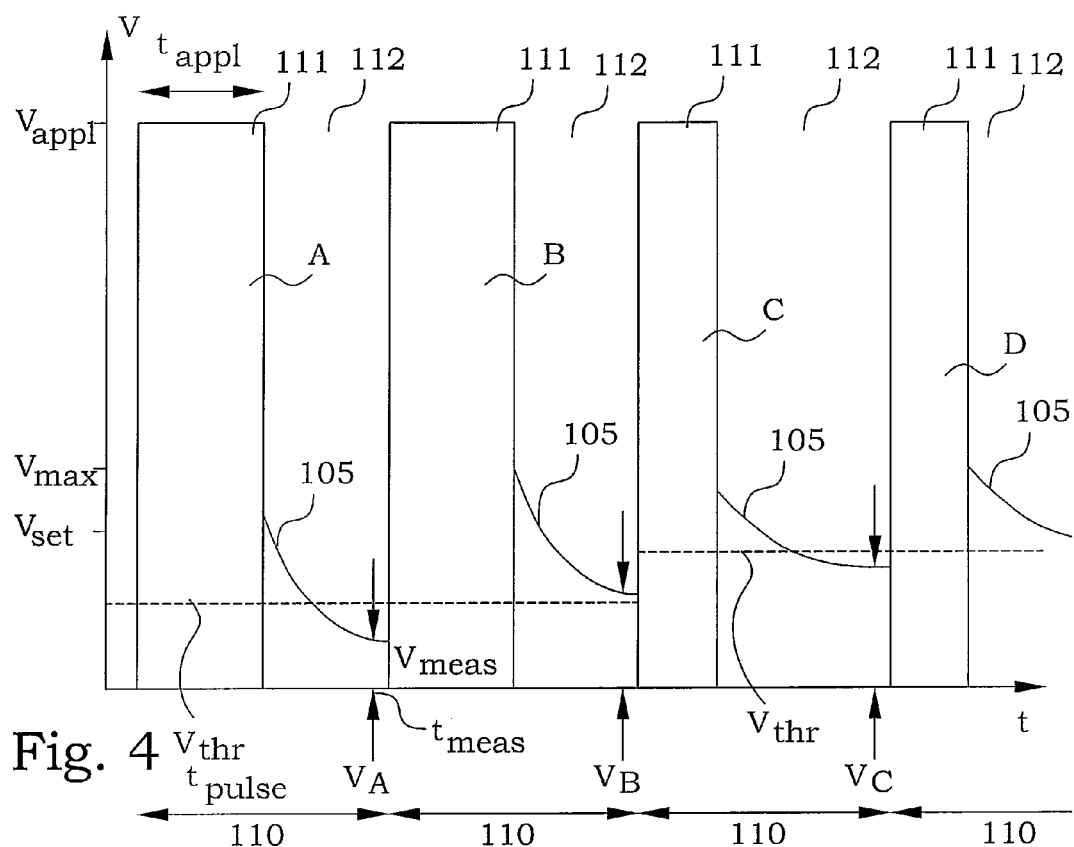
FIG. 4 is a diagram illustrating an embodiment of a sequence of voltage pulses applied to an electrochromic device according to the present invention for coloration purposes.

In embodiments of the present invention, a sequence of voltage pulses is applied between the electron conducting layers of an ECD for changing the optical state of the ECD. In other words, the optical mode is changed to a darker or clearer state. The optical mode of the ECD is changed by charging, i.e. going to darker state, or discharging, i.e. going to a clearer, more transparent, state. Each voltage pulse comprises a voltage signal followed by a period where no voltage is applied. During the period between the applied voltage signals an open circuit is provided between the electron conducting layers. One embodiment is illustrated by FIG. 4. Here, the voltage pulses 110 are constant amplitude $V_{appl}$ voltage pulses. In other words, each voltage pulse 110 consists of a constant voltage "on" mode 111, and a following open circuit, "off" mode 112. Each voltage pulse 110 is characterised by the applied voltage $V_{appl}$, a pulse duration $t_{pulse}$, and an on-time $t_{appl}$, during which the applied voltage $V_{appl}$ is applied. $V_{appl}$ is provided by a power source. The on-time may also be expressed as the duration of applied voltage within a voltage pulse. The on-time $t_{appl}$ may also be expressed in terms of a duty cycle. The duty cycle is defined as the on-time $t_{appl}$ divided by the pulse-duration $t_{pulse}$ and is generally given in percent. The level of the applied voltage $V_{appl}$ applied during the on mode is a design parameter specific for each application, but typically between 1-5 V. The off mode uses a zero applied current, i.e. the ECD experiences an open circuit.

A voltage $V_{meas}$ between the electron conducting layers is measured at least at one time $t_{meas}$ during the period 112 of the open circuit. The measured voltage $V_{meas}$ comprises useful information about the state of the ECD. The most reproducible measurement is believed to be achieved as late as possible in the open circuit time interval, where the relevant relaxation processes have decayed, i.e. the relaxation has reached the plateau, as discussed above. It is therefore presently considered as a preference to perform the measurement in the end of the period 112 of the open circuit, immediately before an onset of a successive voltage pulse 110.

Dependent on the results of the measurement, i.e. the measured voltage, a pulse parameter of the voltage pulses, in this embodiment the pulse duration, can be controlled. By having successive opportunities to measure the actual voltage applied over the ECD, the pulse duration can be adapted to give e.g. a fast initial charging while keeping control over the stationary voltage level. In the final phase of the charging process, the pulse duration can instead be adapted to give a safe approach to the target voltage.

In the embodiment illustrated in FIG. 4, the applied voltage $V_{appl}$ is typically considerably higher than a maximum allowed stationary voltage $V_{max}$ for the ECD. If a typical maximum stationary voltage limit is between 0.6 and 2V, typically around 1.6, the applied voltage in the pulses can easily be 3-5 V. A target voltage $V_{set}$, corresponding to a certain target transmittance level of the ECD is set, and a quick charging of the ECD to this level of transmittance is requested. Four voltage pulses A-D are illustrated. After the first voltage pulse A, a remaining voltage $V_A$ is measured over the ECD in the end of the open circuit period. This voltage $V_A$ is below a temporary threshold voltage $V_{thr}$. No changes are considered as necessary, and an identical second voltage pulse B is applied. In the end of the open circuit period following the second voltage pulse, the remaining voltage $V_B$ is measured. Now, it is found that this voltage exceeds the temporary threshold voltage $V_{thr}$. The charging rate is considered to be reduced.

A third voltage pulse C is therefore controlled to have a shorter duty cycle or on-time duration $t_{appl}$, which means that the amount of charge transferred to the ECD in one single voltage pulse is reduced. This also gives the ECD a longer available relaxation time. The temporary threshold voltage $V_{thr}$ may according to the present embodiment at the same time be adjusted to a new value. The procedure continues, and since the measured remaining voltage $V_C$ does not exceed the new temporary threshold voltage $V_{thr}$, the fourth voltage pulse D is given the same on-time duration $t_{appl}$. The charging continues with successive changes in $t_{appl}$ and $V_{thr}$ until the target voltage $V_{set}$ is reached.

The amount of the change of the on-time duration $t_{appl}$ is a design parameter. One easily implemented possibility is to change the duration by a fixed amount $\Delta t_{appl}$, i.e. the on-time duration is reduced in pre-determined steps. Another possibility is to have the change as a fixed percentage of the present on-time duration $t_{appl}$, so that the on-time duration is reduced by e.g. 30% each time. A third type of reduction scheme is to have a set of predefined on-time durations, in absolute or relative measures, whereby the durations are selected one after the other. In such a way, a well-controlled absorbance change behaviour, see e.g. FIG. 6 below, can be obtained.

Likewise, the changes in the threshold voltage $V_{thr}$ can be performed according to different principles. Also here, a constant stepping up can be used, by defining a voltage difference $\Delta V_{thr}$ by which the threshold voltage $V_{thr}$ is increased every time an update should be performed. Another possibility is to have the change as a fixed percentage of the present difference between the threshold voltage $V_{thr}$ and the target set voltage $V_{set}$. The voltage difference may e.g. be reduced by half, every time the threshold voltage $V_{thr}$ is to be changed. Also here, other schemes of changes are feasible, which together with the schemes of the duration changes, discussed above, can give a requested charging behaviour.

The embodiment presented above is thus a Pulse Width Modulation (PWM) method using a pulsed voltage signal that is modulated in time in terms of frequency and/or duty cycle, producing a number of consecutive voltage pulses, a "pulse train". A typical frequency of the voltage pulses is in the order of 50-1000 Hz, more specifically typically 200-500 Hz. In the PWM approach, the duty cycle may typically vary from e.g. 90% in the beginning of a charging process to 1% in the end, or even less than 1%. During the pulse-train, the present PWM method uses a signal feedback scheme together with a control algorithm to vary the parameters of a subsequent voltage pulse, that is the pulse duration (or frequency) and duty cycle. The feedback signal is sampled during the off mode of the pulse, i.e. during open circuit. In this embodiment, the voltage level at the end of the low-state part of the pulse is used as feedback signal. The subsequent voltage pulse to be controlled can be the first voltage pulse following the sampling period or a later voltage pulse. The sequence of voltage pulses is thus pulse width modulated using a control parameter controlling a duty cycle of the voltage pulses.

The initial values of the pulse parameters are determined either by standard settings and/or by operating a parameter determination or probing stage, preceding each charge/discharge operation. Such an embodiment is described further below. This means that the voltage pulse parameters will vary depending on conditions and application. There is one typically user-related parameter of the algorithm: $V_{set}$, the target voltage, which is directly related to the absorbance level. It determines the new optical mode that the ECD should go to and is derived in a preceding parameter determination stage, and is typically controlled by an operator, e.g. by pressing a button or turning a knob, or by a sensor.

In the present disclosure "voltage pulse parameters" are intended to denote the actual properties of a voltage pulse. "Control parameters" are parameters used for controlling the voltage pulses. Such control parameters may e.g. comprise initial or requested values for voltage pulse parameters, or may comprise different set, stop or threshold values, used in the control process.

The control algorithm, briefly described above, is applied during the pulse train and uses the feedback signal to produce the pulse-parameters for the next or further subsequent pulse in the pulse-train. The control algorithm also includes stop condition control. As discussed further below, interrupt routines may also be implemented. An embodiment of such a control algorithm is illustrated in a flow diagram of FIG. 5A.

The procedure to control the transmittance of an ECD begins in step 200. In step 210, control parameters, such as initial values of voltage pulse parameters or different set parameters are provided. These initial values could be standard values retrieved from a storage or achieved through a probing procedure, one embodiment of which is described more in detail further below. Initial values, in particular of a set voltage, could as mentioned above be provided directly or indirectly from an operator. When applied to the embodiment of FIG. 4, typical voltage pulse parameters to be initiated are $V_{appl}$, $t_{appl}$, and $t_{pulse}$, or parameters associated therewith. Typical control parameters used in the present embodiment are $V_{set}$ and $V_{thr}$.

The information whether a bleaching or colouring is to be performed can be obtained by different means, e.g. by operator input, comparison between the target voltage $V_{set}$ and a voltage over the ECD prior to any operation, or by input from another logical unit. This will be discussed more in detail further below.

In step 212, a voltage pulse is applied over the ECD according to the present voltage pulse parameters. In step 214, a voltage $V_{meas}$ over the ECD is measured during an open circuit period. In step 216, it is determined whether the measured voltage $V_{meas}$ has reached the targeted set voltage $V_{set}$. If that is the case, the procedure continues to step 299, where it is ended. In this embodiment, the reaching of $V_{set}$ is a sole stop condition. If the targeted set voltage $V_{set}$ is not reached, the procedure continues to step 218.

In view of the particular embodiment of FIG. 4, in step 216, it is checked whether bleaching or colouring is to be performed, i.e. whether the voltage over the EDC is to be decreased or increased, as determined in step 210. If colouring is to be performed, the set voltage $V_{set}$ is an upper limit of the ECD voltage within a certain accuracy. The stop criterion is then that the size of $V_{meas}$ is larger than or in reasonable range from $V_{set}$, i.e. $V_{meas} > V_{set} - \delta$, where $\delta$ is an acceptable deviation from the targeted set voltage $V_{set}$. Analogously, if a bleaching is to be performed, the set voltage $V_{set}$ is a lower limit of the ECD voltage within a certain accuracy. The stop criterion is then that the size of $V_{meas}$ is smaller than or in reasonable range from $V_{set}$, i.e. $V_{meas} < V_{set} + \delta$, where $\delta$ is an acceptable deviation from the targeted set voltage $V_{set}$.

In step 218 it is determined whether the measured voltage $V_{meas}$ has reached the present threshold voltage $V_{thr}$. If that is not the case, the procedure continues to step 212, where an additional voltage pulse is applied. If the present threshold voltage $V_{thr}$ is reached, the procedure continues to step 220. In view of the particular embodiment of FIG. 4, in step 218, it is checked whether a change criterion is fulfilled. First, it is checked, analogously to step 216, whether colouring or bleaching is to be performed, as determined in step 210. If colouring is to be performed the change criterion is that the size of $V_{meas}$ is larger than $V_{set}$, i.e. $V_{meas} > V_{thr}$. If bleaching is to be performed the change criterion is that the size of $V_{meas}$ is smaller than $V_{set}$, i.e. $V_{meas} < V_{thr}$. In step 220, a pulse parameter is changed. In PWM embodiments, the on-time $t_{appl}$ or a parameter associated therewith is changed. The $t_{appl}$ parameter is typically reduced, to reduce the average charging rate. In step 222, the control parameters are also updated. In the embodiment of FIG. 4, the $V_{thr}$ value is changed to decrease the difference to the $V_{set}$ value, i.e. to reduce $|V_{set} - V_{thr}|$. The procedure then returns to step 212, where a voltage pulse according to the changed pulse parameter is applied.

Figure 6:
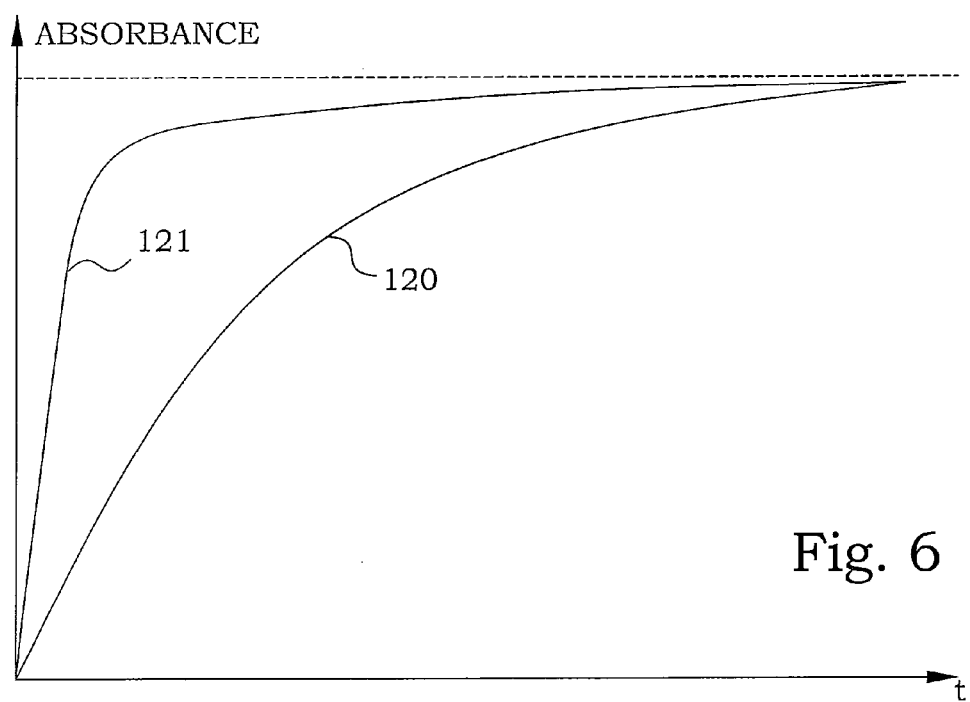
FIG. 6 is a diagram illustrating an embodiment of a procedure of coloration of an electrochromic device according to the present invention.

A consequence of using this algorithm is that the pulse parameters will vary during the charge/discharge stage. FIG. 6 is a diagram illustrating two transmittance control processes. Curve 120 illustrates a conventional charging, where a constant voltage of the size of the target set voltage is applied continuously. Curve 121 illustrates a charging according to the above described embodiment of the present invention. Here, a sequence of voltage pulses are applied, having an applied pulse voltage larger than the target set voltage, but applied in short periods. The parameters of the sequence of voltage pulses are controlled to give a fast, but still reliable charging of the ECD.

Figure 5A:
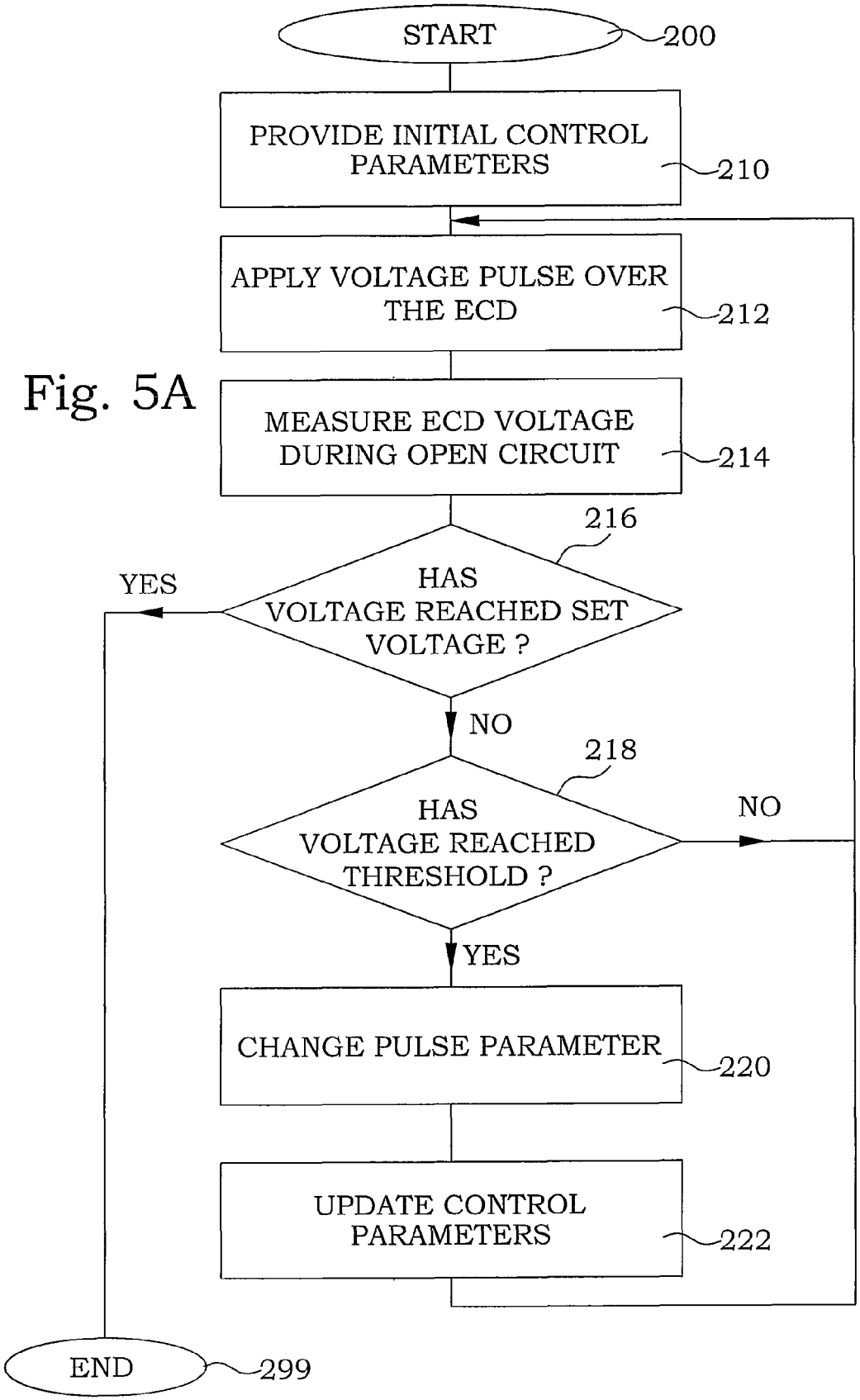
FIG. 5A illustrates a flow diagram of steps of an embodiment of a method for controlling transmittance of an electrochromic device according to the present invention.

In another embodiment, the changes of the threshold voltage $V_{thr}$ can be totally omitted. $V_{thr}$ is then selected equal to the target set voltage $V_{set}$. When the measured voltage reaches the constant threshold voltage $V_{thr}$, the on-time duration $t_{appl}$ is reduced as described above. Since this implies that the time for relaxation is increased simultaneously as the amount of charge provided by the on mode is reduced, the measured voltage typically becomes lower, again smaller than the threshold voltage $V_{thr}$. The step 222 of FIG. 5A is then omitted. The process is then repeated. Since the threshold voltage $V_{thr}$ is set equal to the target set voltage $V_{set}$, a new stop criterion has to be used. One possibility is to continue the process until the available charge in the voltage pulses becomes small, i.e. until a duty cycle of the PWM signal reaches a target duty cycle.

Figure 5B:
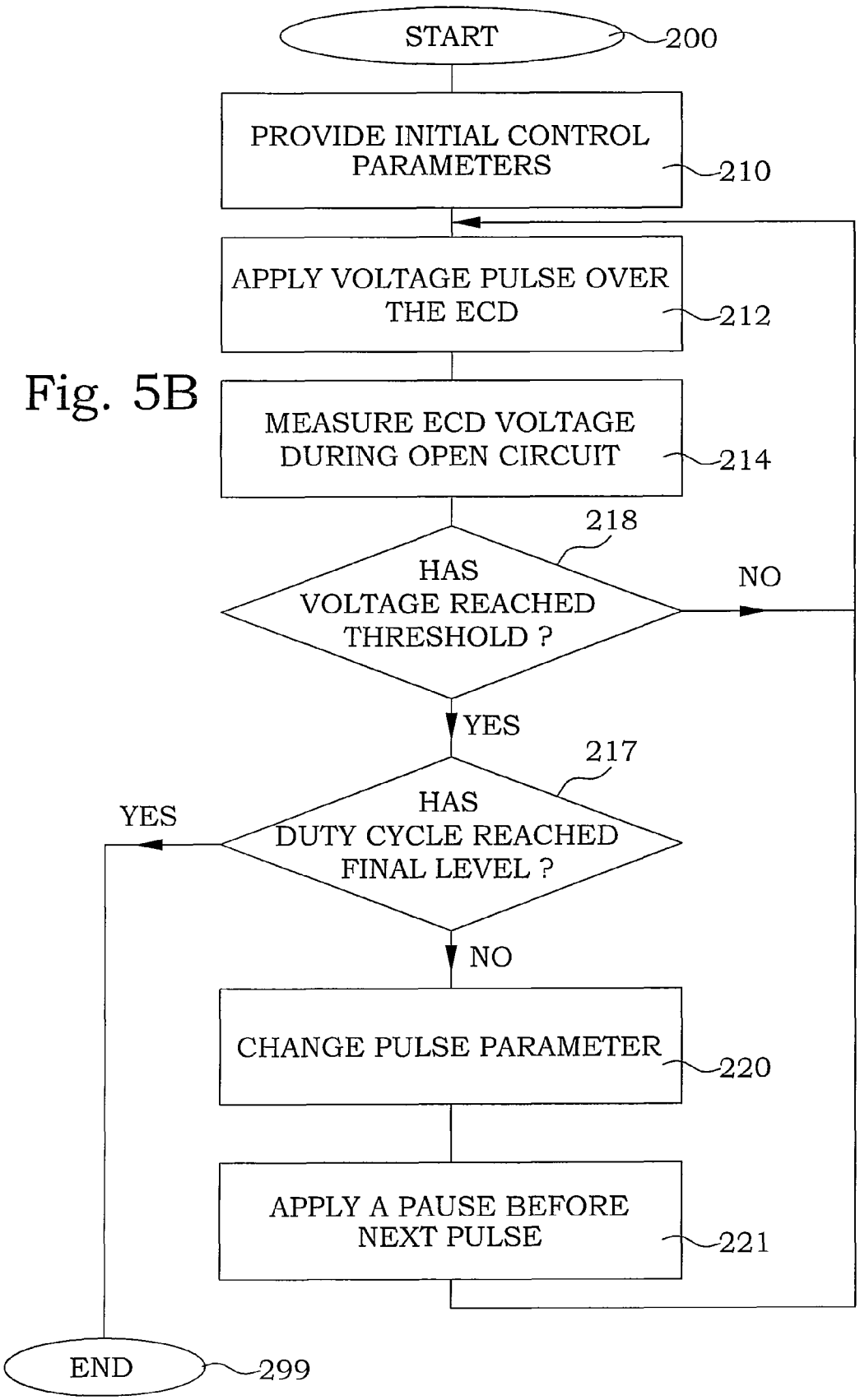
FIG. 5B illustrates a flow diagram of steps of another embodiment of a method for controlling transmittance of an electrochromic device according to the present invention.

This can be illustrated by FIG. 5B. In step 210, control parameters are provided as in the previous embodiment. Typical voltage pulse parameters to be initiated in the present embodiment are applied pulse voltage $V_{appl}$, voltage pulse on-time $t_{appl}$, duty cycle DC, a pause time (described further below) $t_{pause}$ and the pulse time $t_{pulse}$, or parameters associated therewith. The control parameters used in the present embodiment is the targeted duty cycle $DC_{targ}$, change in duty cycle $\Delta DC$ and a constant threshold voltage $V_{thr}$. In step 212, a voltage pulse is applied over the ECD according to the present voltage pulse parameters. In step 214, a voltage $V_{meas}$ over the ECD is measured during an open circuit period. In step 218, it is determined whether the measured voltage $V_{meas}$ has reached the targeted constant threshold voltage $V_{thr}$. If that is not the case, the procedure continues to step 212 again, where an additional voltage pulse is applied. If $V_{meas}$ has reached $V_{thr}$, the procedure continues to step 217, where it is determined whether the present duty cycle DC is equal or less than a final targeted duty cycle $DC_{targ}$. The stop criterion used in this embodiment is thus connected to duty cycle or duration of the "on mode". If the targeted duty cycle $DC_{targ}$ is reached, the procedure is ended in step 299. In other words, if the duty cycle has been reduced to a certain level, the amount of charge that is available at each pulse is so small that the charging condition of the ECD is close to the requested one. Otherwise the process continues to step 220 to change pulse parameters. In the present embodiment, in step 220 the present duty cycle is decreased with $\Delta DC$ and the process continues to step 221, where a rest pause is introduced to let the ECD voltage relax. The pause time $t_{pause}$ can be a constant parameter or can be dependent on e.g. the duty cycle time. After the pause the process continues to step 212, where a new voltage pulse is applied.

Figure 5C:
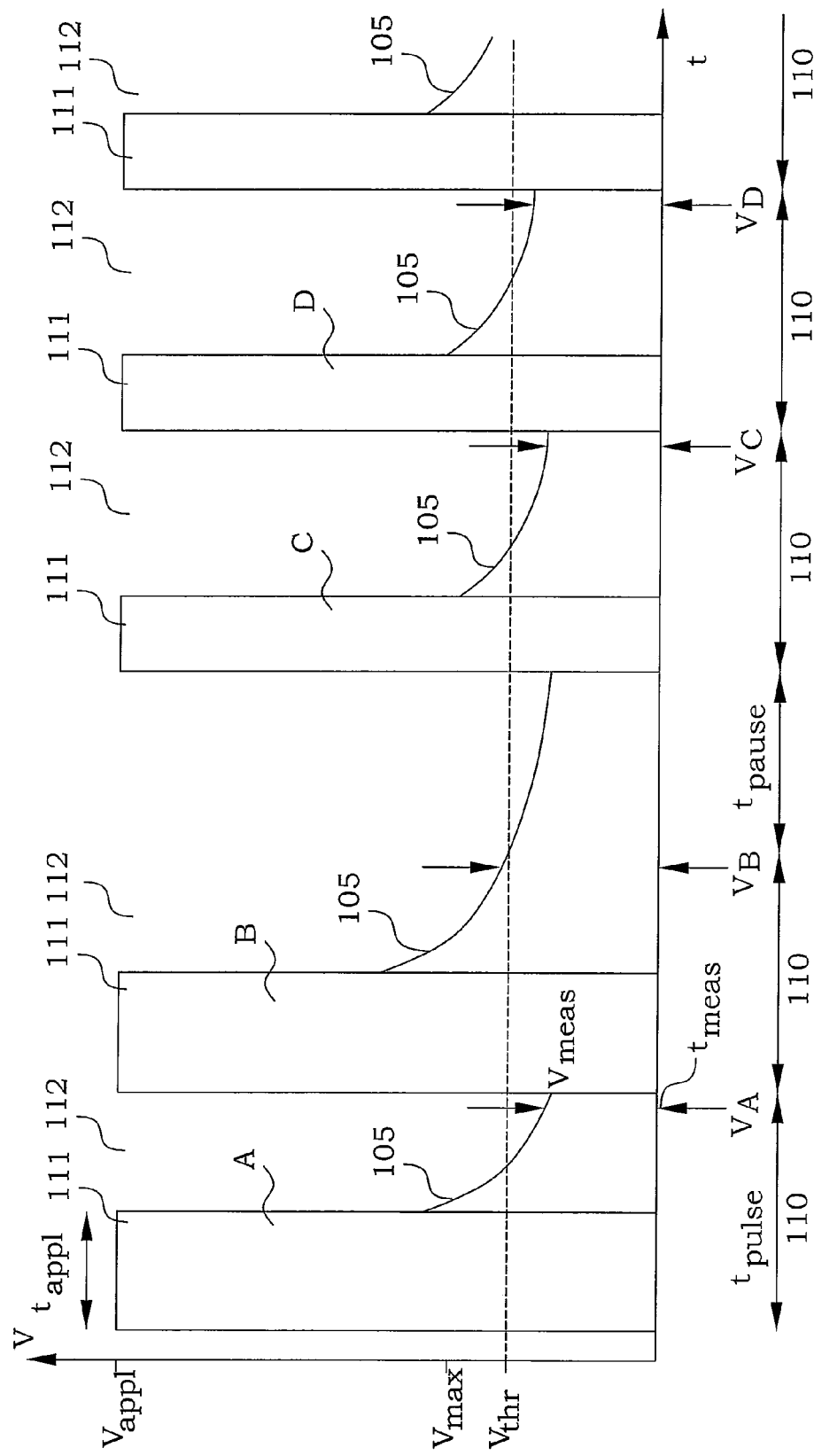
FIG. 5C is a diagram illustrating another embodiment of a sequence of voltage pulses applied to an electrochromic device according to the present invention for coloration purposes.

A typical behaviour of a control procedure according to the embodiment above is illustrated in FIG. 5C. After application of a first pulse, the voltage over the ECD relaxes down to a voltage level below the constant threshold voltage $V_{thr}$. No changes in pulse parameters are made and a new pulse is applied. This time, the ECD voltage does not relax below the threshold voltage $V_{thr}$ and a change in pulse parameters, in this case a reduced duty cycle, is made. An additional pause is also introduced. After the pause, a new pulse is applied, now according to the new duty cycle. The application of pulses then continues until the relaxation of the ECD does not reach down to the voltage threshold $V_{thr}$. When the duty cycle reaches or surpasses the targeted duty cycle, $DC_{targ}$, the entire charging process is stopped.

Figure 5D:
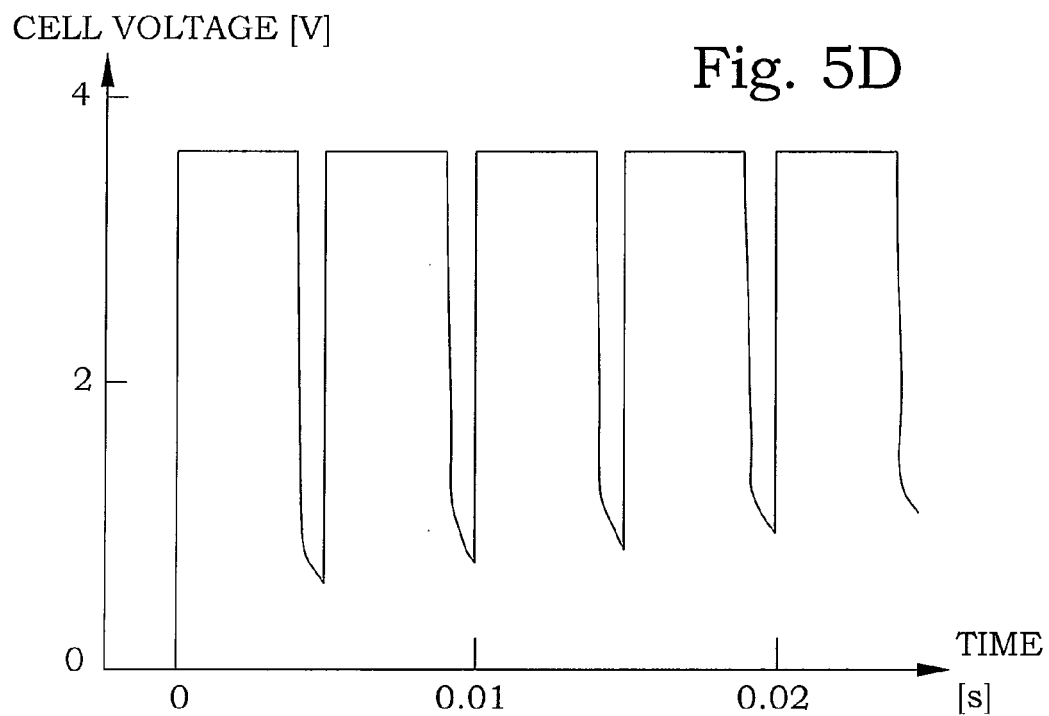
FIGS. 5D and 5E are diagrams illustrating voltage measurements on a test equipment according to the present invention for coloration purposes.
Figure 5E:
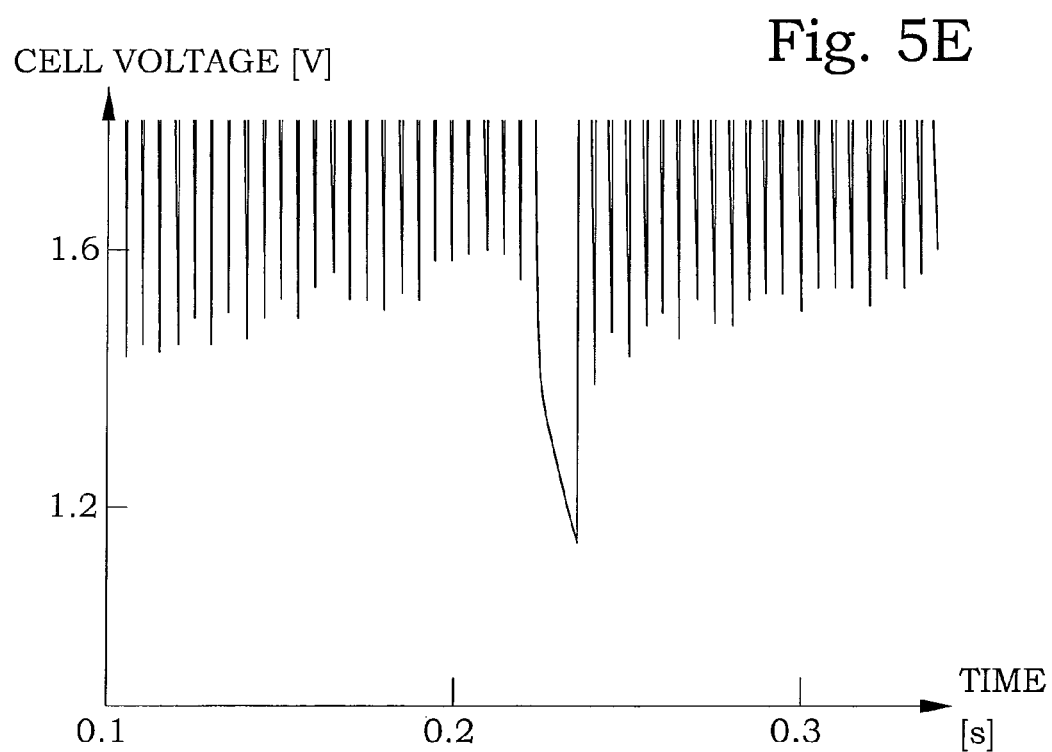

FIG. 5D illustrates real measurements on a test equipment. Voltage pulses of 3.6 V are applied over an ECD for 4 ms and an off time of 1 ms (80% duty cycle) lets the ECD relax ohmically. It is easily seen that for each applied pulse, the relaxed end voltage successively increases. In FIG. 5E, a part of the same sequence but at a later stage is illustrated in a diagram, where the time scale is decreased and the voltage scale is increased. Note that only the bottom part of the voltage curves is shown. In the first part of the diagram a duty cycle of 80% is used. The end voltage during the off time becomes successively higher and when it reaches the threshold voltage, of 1.6 V in this example, the duty cycle is reduced down to 68% and a pause is introduced before the next voltage pulse. One can here see that this initially reduces the following measured end voltages. However, the end voltages once again start to climb up to the threshold value again.

When the target voltage over the ECD is obtained, the ECD is disconnected from the power supply and an essentially constant transmittance is maintained.

Figure 7:
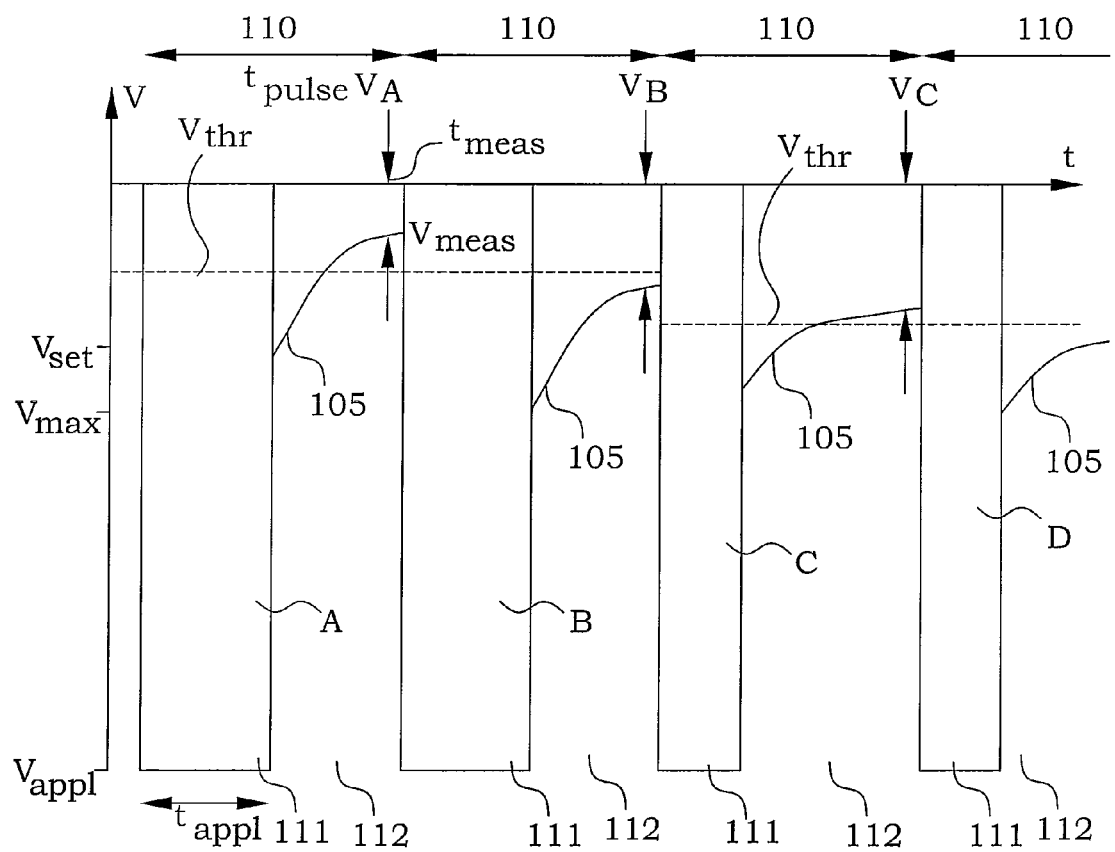
FIG. 7 is a diagram illustrating an embodiment of a sequence of voltage pulses applied to an electrochromic device according to the present invention for bleaching purposes.

If the transmittance is to be changed back again, a similar procedure is performed, however, now with voltage pulses of the opposite sign as compared to the ones used for the original change. A similar scenario will be present, however, with negative voltage values instead. An embodiment, analogue to the one described in FIG. 5A is illustrated in FIG. 7. In this case, the "on mode" corresponds to a negative voltage, whereby the term "on" has to consider the absolute value of the applied voltage signal. Note also that the different parameters of the control algorithms may be different for colouring and bleaching, respectively.

Figure 8:
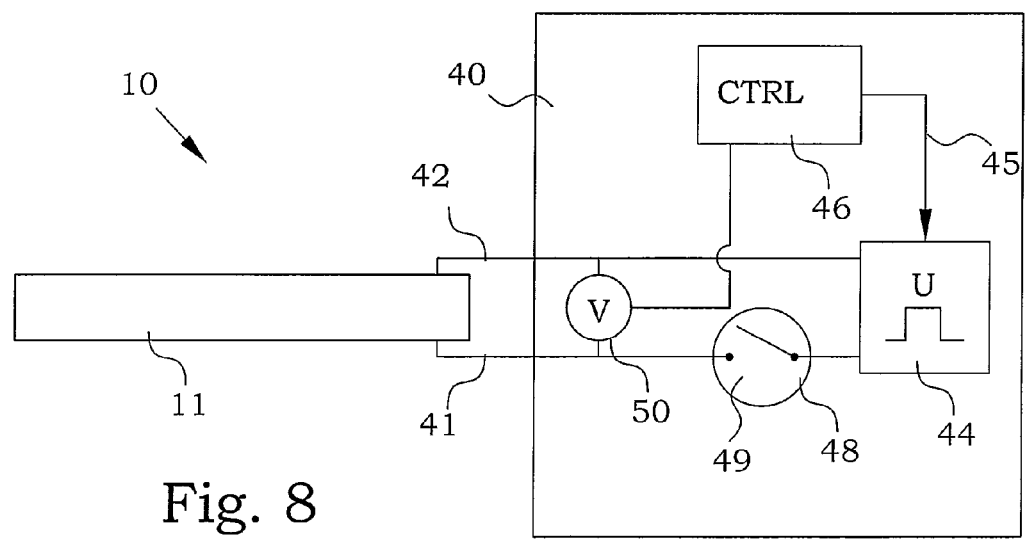
FIG. 8 illustrates a block diagram of parts of an embodiment of an electrochromic device according to the present invention.

An embodiment of an electrochromic device 10 according to the above presented ideas of the present invention is illustrated as a block scheme in FIG. 8. The electrochromic device 10 comprises an electrochromic layer stack 11, e.g. according to what is illustrated in FIG. 1. In summary, the electrochromic layer stack 11 comprises a first electron conducting layer, a second electron conducting layer, a first electrochromic layer at least partially covering the first electron conducting layer, a counter electrode layer at least partially covering the second electron conducting layer, and an electrolyte layer laminated between and at least partially covering the first electrochromic layer and the counter electrode layer.

The electrochromic device 10 further comprises a transmittance controlling electronic device 40, connected by connections 41, 42 to the first and second electron conducting layer, respectively, of the electrochromic layer stack 11. The transmittance controlling electronic device 40 in turn comprises a voltage source 44 arranged for enabling a voltage to be applied over the connections 41, 42, and thereby between the first and second electron conducting layers. The voltage source 44 is arranged for applying a sequence of voltage pulses as a response to certain inputs in the form of control signals 45 from a controller 46. The transmittance controlling electronic device 40 further comprises means 48 for providing an open circuit between the first and second electron conducting layers. This open circuiting takes place between the applied pulse voltages. In the embodiment of FIG. 8, the means 48 for providing an open circuit is a switch 49 provided in one of the connections between the voltage source 44 and the connections 41, 42. The means 48 for providing an open circuit may also be integrated within the voltage source 44 itself.

The transmittance controlling electronic device 40 further comprises a voltage sensor 50 connected between the first and second electron conducting layers and arranged for measuring a voltage during a period of the open circuit. In the embodiment of FIG. 8, the voltage sensor 50 is positioned between the switch 49 and the connections 41, 42. The controller 46 is connected to the voltage sensor 50 for receiving input signals representative to a measured voltage. The controller 46 is arranged for controlling a pulse parameter of the voltage pulses dependent on the received signals from the voltage sensor 50. The pulse parameters are typically controlled by providing suitable control signals 45 to the voltage source 44. As mentioned above, the pulse parameter to be controlled may be the duration of the applied voltage or the pulse voltage. In a typical implementation, one or several of the units 44, 46, 48 and 50 are integrated within one and the same processor and are thus not available as physically separated units.

When using a sequence of voltage pulses, different approaches to control the available charge in the voltage pulses are possible. In the embodiments discussed above, PWM has been utilized. However, in another embodiment, it is also possible to control the voltage amplitude of applied voltage pulses. As above, parameters for controlling applied voltage amplitudes are determined e.g. from a combination of user inputs, such as push button, turn knob or other user interaction devices, or sensor inputs, for example a light sensor, and results of a probing stage. The pulse parameter to be controlled is thus applied pulse voltage.

This embodiment uses also a two-stage pulsed process, similar to the PWM method, with an on and off mode, running in a pulse-train operation. However, in this embodiment, the voltage level of the on mode $V_{appl}$ is altered between the pulses instead of altering pulse width and/or duty cycle. In addition the ratio between on and off mode durations, i.e. an on/off-ratio, is in this embodiment typically much higher and does in a basic embodiment not vary during the pulse train. The duration of the off mode, i.e. the off-time or open circuit period, is typically in the range of 0.1-10 ms. The on/off ratio is typically in the range of 10-300, i.e. a duty cycle of 90-99.7%.

The level of the on mode voltage ($V_{appl}$) is determined during operation through a signal feedback method utilizing a measured voltage signal during the off mode.

Figure 9:
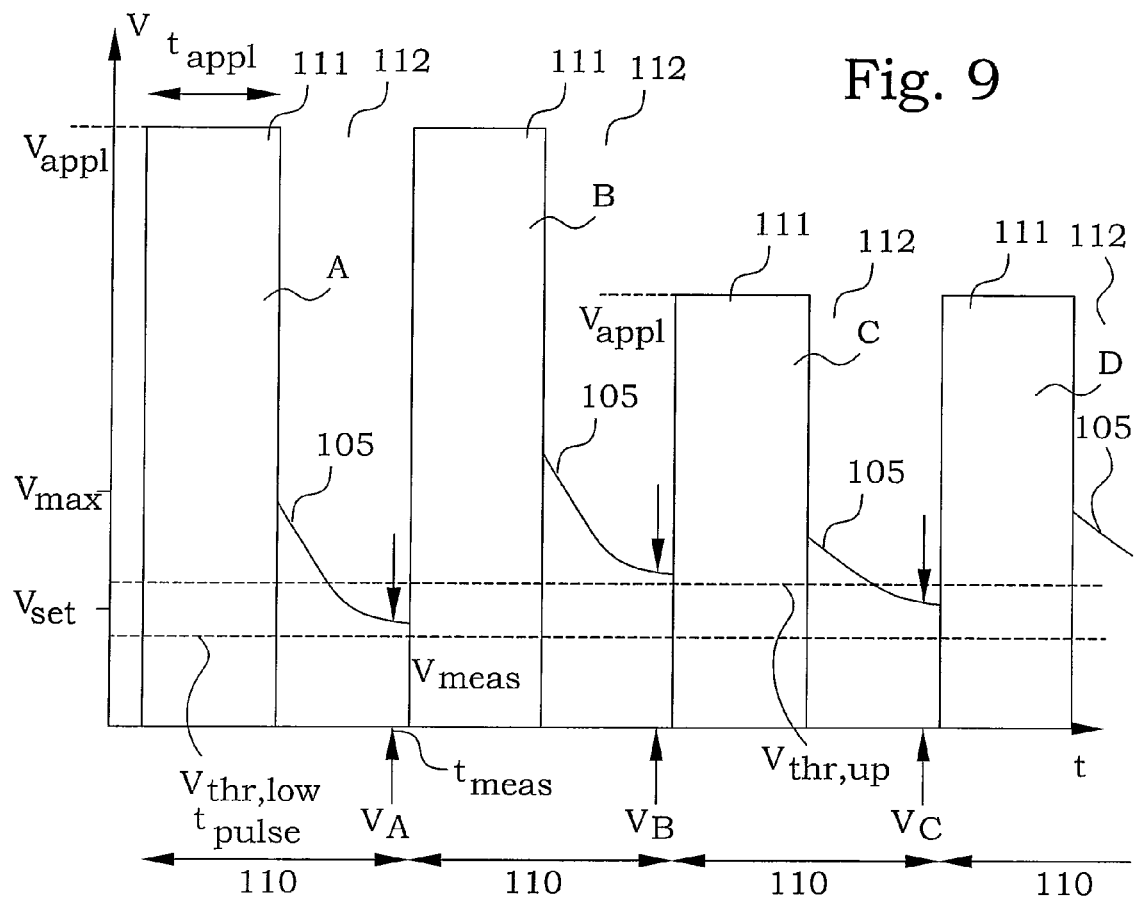
FIG. 9 is a diagram illustrating yet another embodiment of a sequence of voltage pulses applied to an electrochromic device according to the present invention for coloration purposes.

FIG. 9 illustrates a series of voltage pulses using a voltage amplitude variation approach. The applied voltage $V_{appl}$, which may differ from pulse to pulse, is typically considerably higher than a maximum allowed stationary voltage $V_{max}$ for the ECD, at least in an initial phase of the charging process. The duty cycle is kept constant, i.e. the on-time duration $t_{appl}$ of the pulse is constant. In FIG. 9, the illustrated duty cycle is somewhat less than normally used, in order to increase the readability of the figure. A target voltage $V_{set}$, corresponding to a certain target transmittance level of the ECD is set, and a quick charging of the ECD to this level of transmittance is requested. Four voltage pulses A-D are illustrated. After the first voltage pulse A, a remaining voltage $V_A$ is measured over the ECD in the end of the open circuit period. This voltage $V_A$ is above a lower threshold voltage $V_{thr,low}$, but below an upper threshold voltage $V_{thr,up}$. If the remaining voltage $V_A$ would have been lower than the lower threshold voltage $V_{thr,low}$, the applied voltage would have been increased. If the remaining voltage $V_A$ would have been higher than the upper threshold voltage $V_{thr,up}$, the applied voltage would instead have been decreased. However, in the present situation where the remaining voltage $V_A$ is situated between the threshold voltages, no changes are considered as necessary, and an identical second voltage pulse B is applied. In the end of the open circuit period following the second voltage pulse, the remaining voltage $V_B$ is measured. Now, it is found that this voltage exceeds the upper threshold voltage $V_{thr,up}$. The charging rate is therefore considered to be reduced, i.e. reducing the $V_{appl}$.

A third voltage pulse C is therefore controlled to have a lower applied voltage $V_{appl}$, which means that the amount of charge transferred to the ECD in one single voltage pulse is reduced. The procedure continues, and since the measured remaining voltage $V_C$ does not exceed the upper threshold voltage $V_{thr,up}$ and does not fall below the lower threshold voltage $V_{thr,low}$, the fourth voltage pulse D is given the same applied voltage $V_{appl}$. The procedure continues until the applied voltage $V_{appl}$ is reduced to a level reasonably close to the setpoint voltage $V_{set}$, i.e. within a voltage range of $\Delta V$ around $V_{set}$.

There are some parameters of the algorithm of particular importance. $V_{set}$, the setpoint voltage, determines the new optical mode that the ECD should go to. This can be set by an operator or in a preceding parameter determination stage and will in such a case typically vary between every commanded change in the optical mode of the ECD.

The amount of the change of the applied voltage $V_{appl}$ in each step is a design parameter. One easily implemented possibility is to change the voltage by a fixed amount $\Delta V_{appl}$, i.e. the voltage is reduced in pre-determined steps. Another possibility is to have the change as a fixed percentage of the difference between presently applied voltage $V_{appl}$ and the targeted set voltage $V_{set}$. A third type of reduction scheme is to have a set of predefined applied voltages, in absolute or relative measures, whereby the voltages are selected one after the other. Also the threshold voltages $V_{thr,up}$ and $V_{thr,low}$ as well as the accepted voltage range of $\Delta V$ around $V_{set}$ are design parameters.

The variable on mode voltage signal may in turn be produced by means of e.g. a DC-current source. Another possibility is to use a high-frequency PWM current source. The operating frequency is in such a case preferably higher than 500 Hz, so that the capacitive effects of the ECD averages the signal and give rise to different applied voltage levels depending on the PWM duty cycle.

Figure 5F:
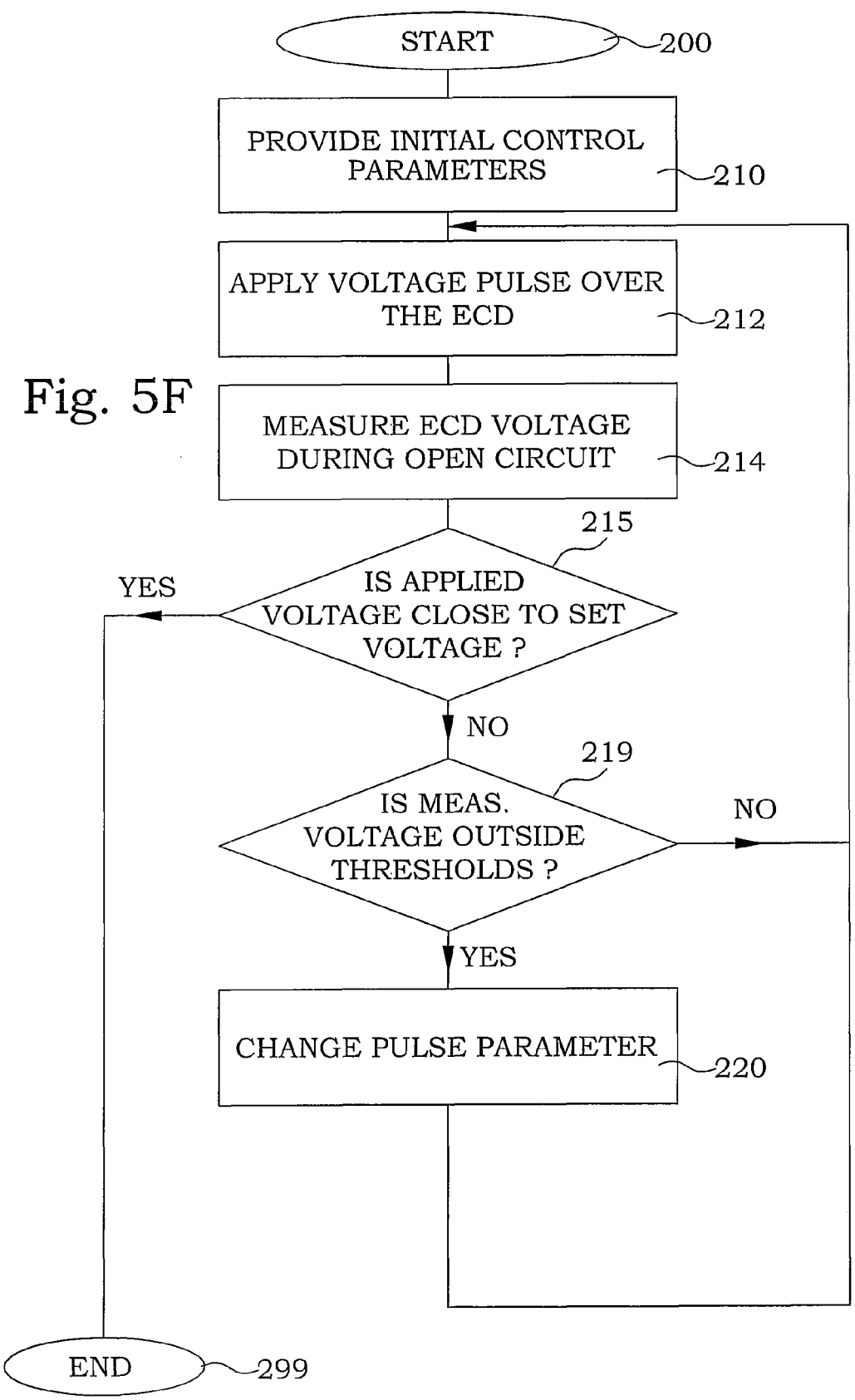
FIG. 5F illustrates a flow diagram of steps of yet another embodiment of a method for controlling transmittance of an electrochromic device according to the present invention.

This procedure follows the same basic ideas as presented in e.g. FIG. 5F. In this embodiment, in step 215, it is checked whether the applied voltage $V_{appl}$ is close enough to the set voltage $V_{set}$. If not, the process continues. In step 219, the measured voltage is evaluated. If the measured voltage falls outside the interval between the voltage thresholds $V_{thr,up}$ and $V_{thr,low}$, an adjustment is required. Therefore, in step 220, a pulse parameter is changed. In the present embodiment, the pulse parameter to be changed is the voltage amplitude.

As anyone skilled in the art realizes, the above principles of varying a voltage amplitude can also be used in a discharging procedure, i.e. when negative voltage pulses are applied.

The process of starting up a change in transmittance of an ECD can be accomplished in many various ways. One approach to an automatic operation is to have the process dependent on some kind of sensor. For example, if a light sensor experiences a too high light intensity, a signal may be given to the control means of the ECD to start a process of reducing the transmittance. The control parameters may then be determined by design considerations or may at least to a part be dependent on measured quantities.

In other approaches, an operator action replaces or is an alternative to an automatic starting up of the transmittance change. The operator action can be of various kinds. In a very simple set-up, a push-button may be provided. A first push on the button may start an increase in transmittance, a successive second push may start a decrease in transmittance. The processes are then performed according to pre-set control parameters until standard levels of "light" and "dark" are reached. In another example, the push-button may be configured in such a way that a first push gives an order for giving a first level of reduced transmittance, a second push gives a second level of further reduced transmittance, and so on. An n:th push on the push-button may then be configured to give an order to return to a maximum transmittance level.

If a two-way button is used, more elaborate schemes can be achieved. Turning the button in one direction can then be configured to mean an order for increased transmittance, while turning the button in the other direction may give a decreased transmittance. By using a turn-knob with pre-defined discrete positions or a continuous setting, different levels of transmittance can easily be selected by the operator.

The above process of increasing or decreasing transmittance in an ECD has so far been described as being stopped by any stop criterion, where the stop criterion is a design parameter or is set by en operator. However, in particular embodiments, the process can be interrupted anywhere in the process. Such interruption may be ordered by an operator or sensor output. In a sensor approach, a change in transmittance may be started, and when an appropriate level is reached, a sensor can interrupt the transmittance change procedure. In the case of an operator control, many different scenarios are possible. It can e.g. be combined with a push-button operation, where a transmittance change only takes place when the button is pressed down. In another example, a first push may indicate a start of a transmittance change and a next push indicates an interruption order, if the transmittance change still is in progress. Anyone skilled in the art realises that the possible variations are enormous.

In the procedures described above, certain control parameters are used. Non-exclusive examples are e.g. $V_{set}$, $\Delta V$, initial $V_{thr}$, $\Delta V_{thr}$ or method to derive such a quantity, $V_{thr,up}$, $V_{thr,low}$, initial $V_{appl}$, initial $t_{appl}$, $\Delta V_{appl}$ or $\Delta t_{appl}$ or method to derive such quantities, duty cycle and duty cycle change. Such parameters may be set by design or may be provided directly or indirectly by an operator, as mentioned above. In order to obtain an optimum charging/discharging, which depends on e.g. temperature, age, design features etc, many of these parameters have to be adapted accordingly. In a preferred embodiment of the present invention, a probing procedure provided before the actual charging or discharging takes place. During such probing procedure, appropriate control parameters are deduced from measurements associated with the ECD.

The embodiment is thus a method comprising three stages for changing the optical state of the ECD. The stages are a probe stage, a parameter determination stage, and finally a charge or discharge stage, typically including a stop condition.

Figure 10:
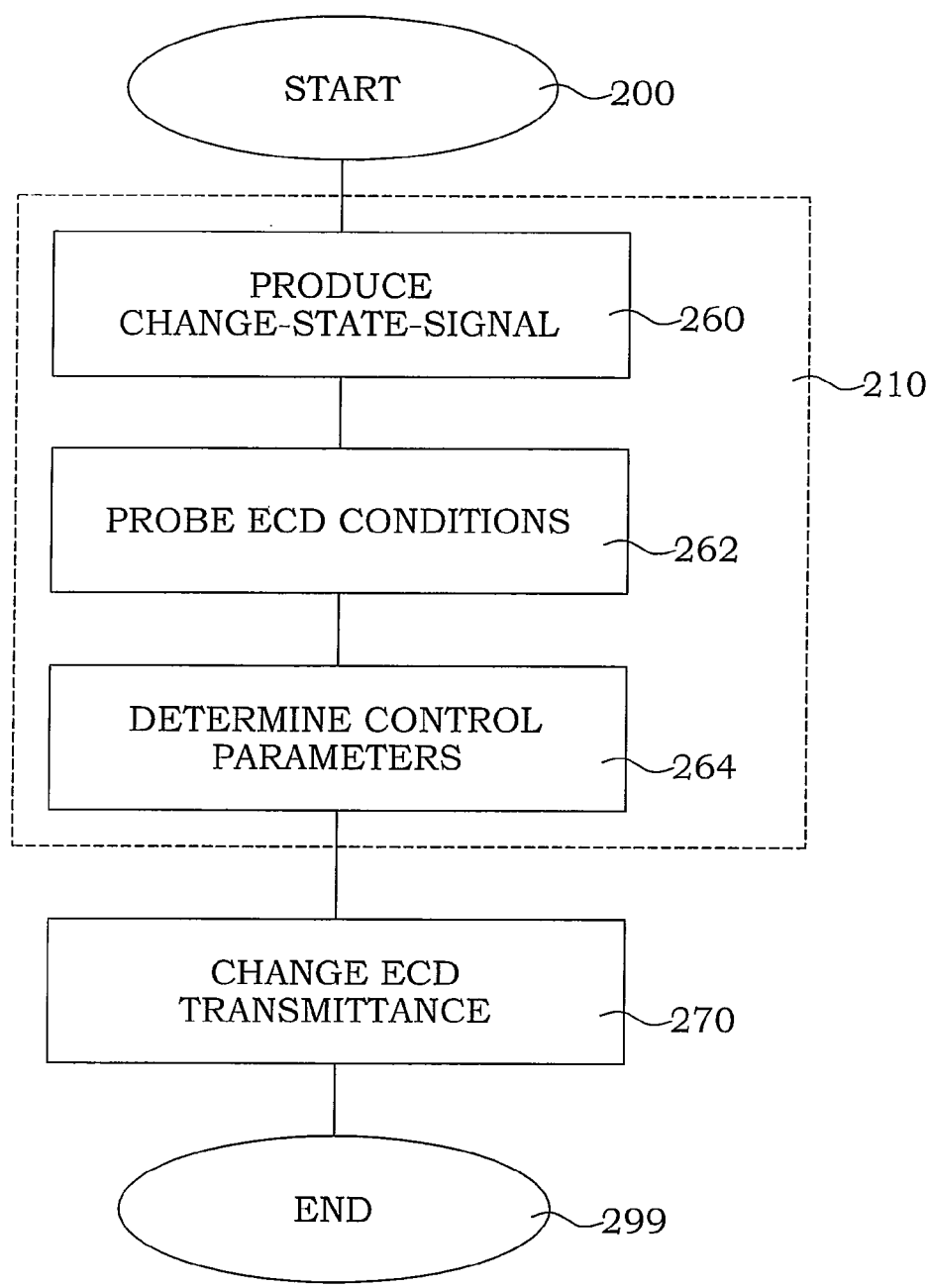
FIG. 10 illustrates a flow diagram of steps of another embodiment of a method for controlling transmittance of an electrochromic device according to the present invention.

An embodiment of a method of controlling transmittance of an electrochromic device according to the three stage ideas is illustrated in FIG. 10. The procedure starts in step 200. When a user wants to change the transmittance of an ECD or when surrounding conditions so require, a change-state-signal is produced, in step 260. This signal is provided by the user, using e.g. a push-button or a turn-knob, or by other means, such as a sensor or system input. A controller then first applies a probe stage 262, where conditions of the ECD are probed. After the probe stage, the results of the probe stage are processed in a parameter determination stage 264 together with the change-state-signal to determine the appropriate control parameters for the final charge or discharge stage. Also stop condition parameters are typically determined. The steps 260, 262 and 264 can be considered as part steps comprised in the more general step 210, as described in connection with FIG. 5.

After, and preferably immediately after, the parameter determination stage 264 follows a step 270, where the transmittance of the ECD is changed. This is performed by a charge or discharge stage, in which the control circuit applies a pulsed charge or discharge signal. This is preferably performed according to the embodiment presented by the steps 212-222 in FIG. 5A, 5B or 5F. The entire procedure ends in step 299.

In an embodiment of the probe stage, which always occurs prior to the parameter determination stage and the charging or discharging stage, environmental conditions, such as temperature or light, the present transmittance level of the ECD and ageing effects of the ECD are characterized. It may also produce information on the type of ECD which is used, making the overall method of the present embodiment universal and applicable to any size or type of non-selferasing ECD.

Figure 11:
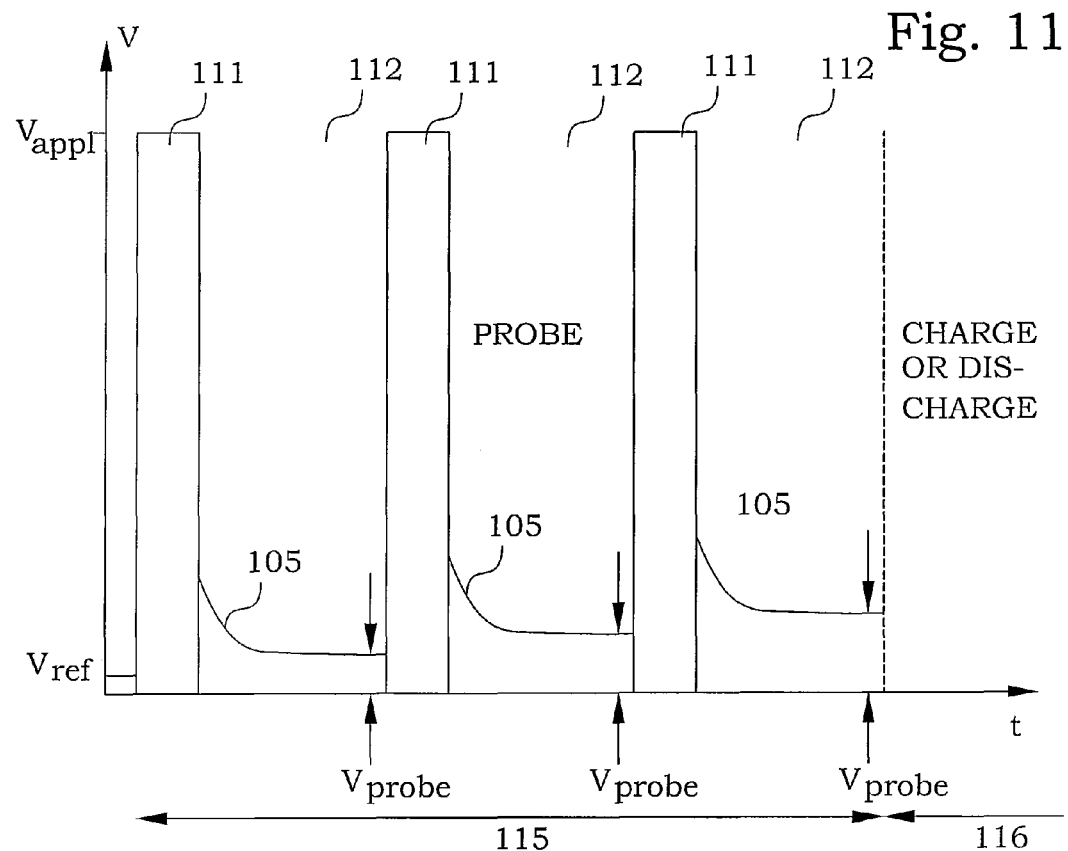
FIG. 11 is a diagram illustrating an embodiment of a sequence of voltage pulses applied to an electrochromic device used for probing purposes according to an embodiment of the present invention.

The present embodiment of a probe stage uses a sequence of voltage pulses with on and off modes, similar to the PWM charge or discharge method described above, to characterize the ECD. This is schematically illustrated in FIG. 11. The number of voltage pulses 110 applied may vary depending on the conditions, but is at least one, typically about 5 and preferably less than 10. The voltage pulses 110 are short and few enough not to give any large change of the ECD state, since they are mainly intended for probing purposes, not for the actual charging. In the present embodiment, and unlike the following charge or discharge process, the voltage pulses 110 within a probe stage 115 have predetermined pulse parameters, i.e. the voltage pulses 110 are identical. Also in the probe stage, the voltage pulses 110 comprises a period 112, where an open circuit is provided with regard to the ECD. A voltage between the first and second electron conducting layers of the ECD is measured at least once during at least one of the periods 112 between the applied voltages 111 during this probe state, giving a number of probing voltages $V_{probe}$. In a preferred embodiment, also a reference voltage $V_{ref}$ between the first and second electron conducting layers before the pulses of the probing state is measured.

The probe stage can be operated by either charging or discharging the ECD. Preferably, charging is used where a following charging is commanded and discharging is used where a following discharging is commanded. FIG. 11 illustrates charging during the probe stage. Discharging is achieved by instead selecting the applied voltage lower than the reference voltage.

The measured reference voltage $V_{ref}$ gives information about the present ECD state. The measured probing voltages $V_{probe}$ depends on the properties of the ECD, such as temperature, age etc. The probing voltages $V_{probe}$, or rather the difference between the probing voltages and the reference voltage thus reflect the impact the probe stage pulses have on the ECD. By analysing such results in the parameter determination stage, properties of the ECD can be concluded and suitable control parameters, such as initial $V_{appl}$, initial $t_{appl}$, $V_{thr}$ and $V_{set}$ can be determined. The determination is thus based on at least one, and preferably several, probing voltages and preferably also on the reference voltage. These control parameters are then used in the charging or discharging process 116 following preferably immediately after the probe stage 115.

Figure 12:
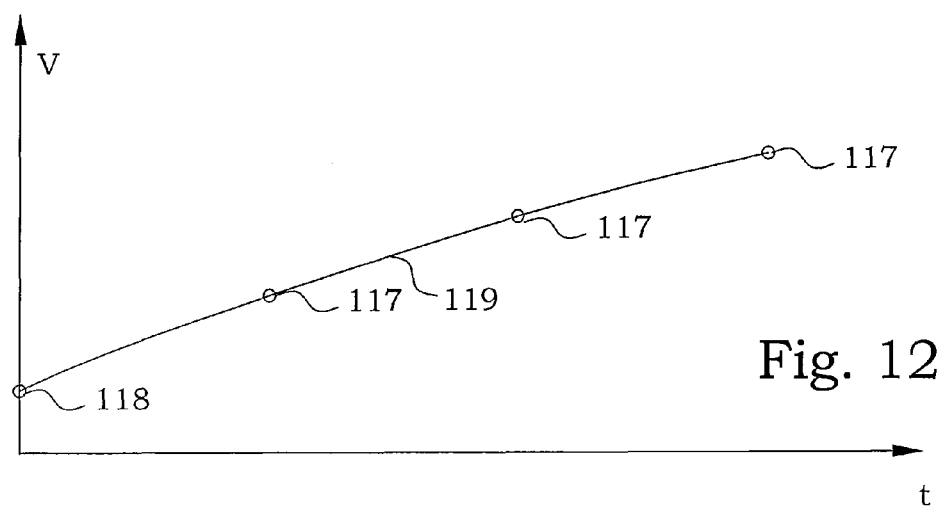
FIG. 12 is a diagram illustrating an evaluation of probing measurements.

The parameter determination stage thus uses input from the probe stage and the change-state-signal to produce control parameters for the following charge or discharge stage. The algorithm used for converting the input to control parameters may vary. One primitive such method uses the difference between a last probing voltage and the reference voltage as an input to a "lookup-table" having suitable control parameters pre-stored. If several probing voltages are provided within each open circuit period, a time averaging of the probing voltages can be used instead to reduce measurement noise. FIG. 12 is a diagram illustrating another embodiment, where a reference voltage 118 and three probing voltages 117 from successive open circuit periods are plotted. A polynomial fitting 119 to the measured voltages 117, 118 can be performed and the coefficients of the terms can instead be used as input to the look-up table. Also other types of signal conditioning can be applied to the probe stage data and more complex logics or algorithms can be used to obtain suitable control parameters, e.g. different kinds of digital computation of function values based on the measured probing voltages. There may also be an input request about the required transmittance level e.g. in the change-mode-signal. The transmittance controlling step is then performed for reaching that target transmittance.

Figure 13:
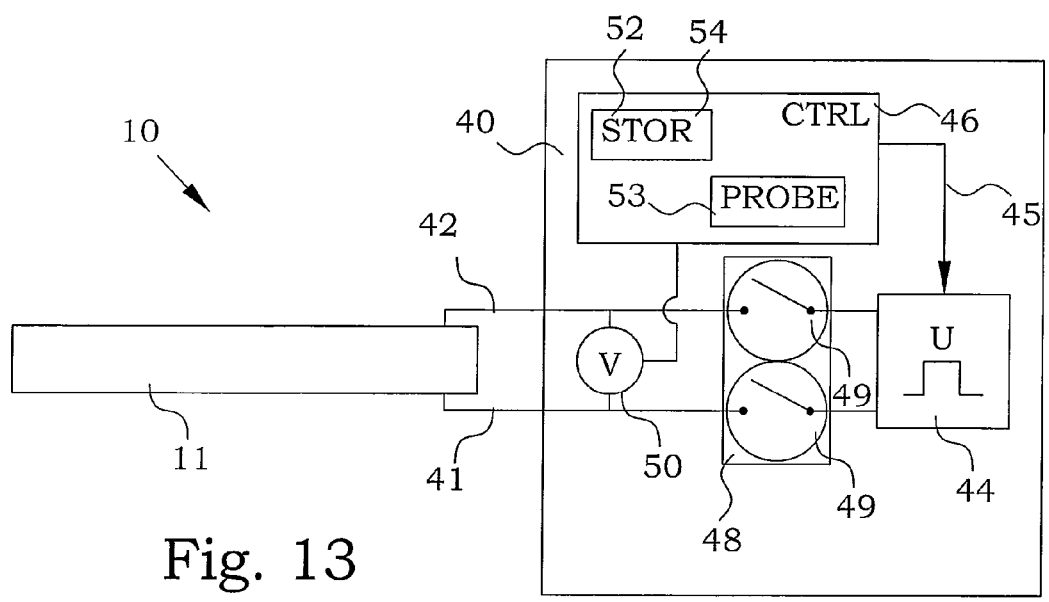
FIG. 13 illustrates a block diagram of parts of another embodiment of an electrochromic device according to the present invention.

An embodiment of an electrochromic device providing a probing stage is illustrated in FIG. 13. It resembles the embodiment of FIG. 8, and similar parts are not described again. In this embodiment, the means 48 for providing an open circuit between the first and second electron conducting layers comprises two switches 49 provided in each of the connections between the voltage source 44 and the connections 41, 42. Furthermore, the controller 46 comprises means 53 for defining a probing stage. This means 53 can in alternative embodiments be provided separate from the controller 46. The probing stage comprises typically the first n voltage pulses of a sequence of voltage pulses, where $n \geq 1$. The voltage supply 40 is further arranged to provide the voltage pulses also within the probing stage. The voltage sensor 50 is further arranged for measuring at least one probing voltage between the first and second electron conducting layers during the probing state. Finally, means 52 for determining control parameters for the controller 46, in this embodiment a look-up table 54 is provided within or in connection with the controller 46. The selection of control parameters are based on inputs derived from the probing voltages.

In the embodiments presented above, one measuring occasion in each open circuit period has been assumed. However, in the probing stage as well as in the actual charging or discharging process, alternative schemes are possible. If one wants to use parameters of the voltage relaxation process for providing an even more optimized charging process, more than one measuring occasion in each open circuit period may be provided. At the contrary, if processing power is limited, it might be sufficient to have a feed-back for the control more seldom, which means that measurements are not necessarily performed in each open circuit period.

It is preferred if the analysis and feed-back of the probing stage and in the charging or discharging stage is finalized before the onset of the first subsequent voltage pulse. However, in other embodiments, it is possible to make a more thorough evaluation and instead implement any changes to any later subsequent voltage pulse.

In the different embodiments presented above, either the pulse voltage amplitude or the on-time duration is the subject for control. However, it is also possible to control both these parameters at the same time. Furthermore, in the previous, constant pulse duration has been assumed. However, also the pulse duration or frequency can be a subject of pulse control, together with voltage amplitude or on-time duration.

The overall method described in the present invention, used to change optical state of ECD's, has several benefits. It provides for a rapid optical modulation and allows for changes of the optical state to any arbitrary transmittance level. The method may take ageing and environmental parameters, such as light intensity, temperature etc., into account every time the optical mode is switched. Furthermore, it prevents electric overload that may lead to degradation of the electrochromic device. All this is achieved by methods possible to implement in non-expensive circuitry, which also is suitable for mass production. The generic scheme for control with "calibration" of control parameters makes the method suitable for many different applications. It operates with both dark-to-clear, i.e. binary, operation of the ECD as well as with variable transmittance operation. Finally, it operates with both user controlled input and input from other technical control or sensor systems.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

U.S. Pat. No. 4,412,215
U.S. Pat. No. 5,822,107

U.S. Pat. No. 6,404,532
U.S. Pat. No. 7,133,181
Publ. int. pat. appl. WO 97/28484
U.S. Pat. No. 6,084,700

The invention claimed is:

1. A method of controlling transmittance of an electrochromic device having a first electron conducting layer and a second electron conducting layer, a first electrochromic layer at least partially covering said first electron conducting layer, a counter electrode layer at least partially covering said second electron conducting layer and an electrolyte layer laminated between and at least partially covering said first electrochromic layer and said counter electrode layer, said method comprising the step of:
applying a sequence of voltage pulses between said first and second electron conducting layers;
said step of applying further comprises providing an open circuit between said first and second electron conducting layers between periods of applied voltage;
measuring at least one value of a voltage between said first and second electron conducting layers over said first electrochromic layer, said electrolyte layer and said counter electrode layer during a period of said open circuit, after relaxation of ohmic losses in said first electrochromic layer, said electrolyte layer and said counter electrode layer; and
controlling an applied pulse voltage dependent on said measured at least one voltage value.

2. The method according to claim 1, wherein said step of measuring is performed in the end of said period of said open circuit, immediately before an onset of a successive voltage pulse.

3. The method according to claim 1, further comprising:
defining a probing stage comprising the first n voltage pulses of said sequence of voltage pulses, where n≧1;
voltage pulses within said probing stage having a predetermined said pulse parameter;
measuring at least one probing voltage between said first and second electron conducting layers during at least one period between said periods of applied voltages during said probing state;
determining control parameters of said step of controlling, based on at least said at least one probing voltage.

4. The method according to claim 3, wherein n<10.

5. The method according to claim 3, wherein
said step of measuring further comprises measuring of a reference voltage between said first and second electron conducting layers before said probing state; and
said step of determining control parameters is further based on said reference voltage.

6. The method according to claim 3, wherein an open circuit is provided between said first and second electron conducting layers between said periods of applied voltages also during said probing state.

7. The method according to claim 3, wherein said step of determining comprises retrieving of said control parameters from a look-up table using a value derived from at least said at least one probing voltage as input.

8. The method according to claim 7, wherein said value derived from at least said at least one probing voltage is a time average of said at least one probing voltage.

9. The method according to claim 7, wherein said step of determining comprises polynomial fitting of a number of probing voltages.

10. The method according to claim 1, comprising the further step of setting a target transmittance, whereby said controlling step is performed for reaching said target transmittance.

11. The method according to claim 1, wherein said step of controlling an applied pulse voltage applies a voltage that is considerably higher than a maximum allowed stationary voltage for said electrochromic device in an initial phase of a charging process.

12. The method according to claim 1, wherein said step of controlling an applied pulse voltage changes said applied voltage by one of:
a fixed amount,
a fixed percentage of a difference between presently applied voltage and a targeted set voltage, and
according to a set of predefined applied voltages, in absolute or relative measures,
when said measured at least one voltage value exceeds an upper threshold voltage or falls below a lower threshold.

13. An electrochromic device, comprising:
a first electron conducting layer;
a second electron conducting layer;
a first electrochromic layer at least partially covering said first electron conducting layer;
a counter electrode layer at least partially covering said second electron conducting layer;
an electrolyte layer laminated between and at least partially covering said first electrochromic layer and said counter electrode layer; and
a transmittance controlling electronic device;
said transmittance controlling electronic device in turn comprising:
a voltage source connected between said first and second electron conducting layers and arranged for applying a sequence of voltage pulses; and
means for providing an open circuit between said first and second electron conducting layers between periods of applied voltages;
a voltage sensor connected between said first and second electron conducting layers and arranged for measuring at least one value of a voltage over said first electrochromic layer, said electrolyte layer and said counter electrode layer during a period of said open circuit, after relaxation of ohmic losses in said first electrochromic layer, said electrolyte layer and said counter electrode layer; and
a controller connected to said voltage sensor and said voltage source;
said controller being arranged for controlling an applied pulse voltage dependent on an output from said voltage sensor.

14. The electrochromic device according to claim 13, wherein said controller further comprises:
means for defining a probing stage comprising the first n voltage pulses of said sequence of voltage pulses, where n≧1;
said voltage supply being arranged to provide voltage pulses within said probing stage having a predetermined said pulse parameter;
said voltage sensor being arranged for measuring at least one probing voltage between said first and second electron conducting layers during at least one period between said periods of applied voltages during said probing state; and by
means for determining control parameters for said controller, based on at least said at least one probing voltage.

* * * * *